(12) United States Patent
Patel et al.

(10) Patent No.: US 12,447,192 B1
(45) Date of Patent: Oct. 21, 2025

(54) STABLE CANNABINOID-COMPRISING NANOEMULSIONS AND METHODS OF USING THE SAME

(71) Applicant: SGN Nanopharma Inc., Tampa, FL (US)

(72) Inventors: Pranav M. Patel, Land O Lakes, FL (US); Navdeep Jaikaria, Titusville, NJ (US)

(73) Assignee: SGN NANOPHARMA INC., Tampa, FL (US)

( * ) Notice: Subject to any disclaimer, the term of this patent is extended or adjusted under 35 U.S.C. 154(b) by 362 days.

(21) Appl. No.: 17/401,826

(22) Filed: Aug. 13, 2021

Related U.S. Application Data

(60) Provisional application No. 63/065,756, filed on Aug. 14, 2020.

(51) Int. Cl.
| | |
|---|---|
| *A61K 38/13* | (2006.01) |
| *A61K 9/00* | (2006.01) |
| *A61K 9/107* | (2006.01) |
| *A61K 31/05* | (2006.01) |
| *A61K 31/352* | (2006.01) |
| *A61K 47/44* | (2017.01) |
| *A61P 27/04* | (2006.01) |

(52) U.S. Cl.
CPC ............ *A61K 38/13* (2013.01); *A61K 9/0048* (2013.01); *A61K 9/1075* (2013.01); *A61K 31/05* (2013.01); *A61K 31/352* (2013.01); *A61K 47/44* (2013.01); *A61P 27/04* (2018.01)

(58) Field of Classification Search
None
See application file for complete search history.

(56) References Cited

U.S. PATENT DOCUMENTS

| | | | |
|---|---|---|---|
| 6,946,150 B2 | 9/2005 | Whittle | |
| 7,709,536 B2 | 5/2010 | Whittle | |
| 8,211,946 B2 | 7/2012 | Whittle | |
| 8,603,515 B2 | 12/2013 | Whittle | |
| 9,095,563 B2 | 8/2015 | Sekura et al. | |
| 10,004,684 B2 | 6/2018 | Whittle et al. | |
| 10,172,809 B2 | 1/2019 | Aung-Din | |
| 10,179,683 B2 | 1/2019 | Whittle | |
| 10,226,496 B2 | 3/2019 | Sekura et al. | |
| 2007/0213296 A1* | 9/2007 | Zhang | A61K 31/573 514/47 |
| 2020/0237622 A1* | 7/2020 | Campos | A61J 7/0046 |

OTHER PUBLICATIONS

Nava et al. (Toxics, 10 (12), 758, 2022). (Year: 2022).*
Surat (Potential Contaminants in CBD and THC, available online on Jan. 24, 2019) (Year: 2019).*
Leonard J: "What to know about CBD isolate", newsletter article from Medical News Today, dated Mar. 11, 2020, https://www.medicalnewstoday.com/articles/cbd-isolate#what-it-is, retrieved Sep. 8, 2021 (11 pages).
Laprairie RB, Bagher AM, Kelly ME, Denovan-Wright EM: "Cannabidiol is a negative allosteric modulator of the cannabinoid CB1 receptor". Br J Pharmacol. Oct. 2015;172(20):4790-805.
Pertwee RG: "The diverse CB1 and CB2 receptor pharmacology of three plant cannabinoids: delta9-tetrahydrocannabinol, cannabidiol and delta9-tetrahydrocannabivarin". Br J Pharmacol. Jan. 2008;153(2):199-215.
Donnenfeld E, Pflugfelder SC: "Topical ophthalmic cyclosporine: pharmacology and clinical uses". Surv Ophthalmol. 2009;54:321-338, Abstract only (30 pages).
Foulks G: "Topical cyclosporine for treatment of ocular surface disease". Int Ophthalmol Clin. 2006;46:105-122.
Porcella A, Casellas P, Gessa GL, Pani L: "Cannabinoid receptor CB1 mRNA is highly expressed in the rat ciliary body: implications for the antiglaucoma properties of marihuana". Brain Res Mol Brain Res. 1998;58:240-5, Abstract only (2 pages).
Stamer WD, Golightly SF, Hosohata Y, Ryan EP, Porter AC, Varga E, et al: "Cannabinoid CB(1) receptor expression, activation and detection of endogenous ligand in trabecular meshwork and ciliary process tissues". Eur J Pharmacol. 2001;431:277-86.
He F, Song ZH. "Molecular and cellular changes induced by the activation of CB2 cannabinoid receptors in trabecular meshwork cells". Mol Vis. 2007;13:1348-56.
Lu Q, Straiker A, Maguire G. Expression of CB2 cannabinoid receptor mRNA in adult rat retina. Vis Neurosci. 2000; 17:91-95 Abstract only (2 pages).
Njie YF, Qiao Z, Xiao Z, Wang W, Song ZH: "Narachidonylethanolamide-induced increase in aqueous humor outflow facility". Invest Ophthalmol Vis Sci. 2008;49:4528-34.
Hingorani T, Gul W, Elsohly M, Repka MA, Majumdar S: "Effect of ion pairing on in vitro transcorneal permeability of a Delta(9)-tetrahydrocannabinol prodrug: potential in glaucoma therapy". J Pharm Sci. 2012;101:616-26.
Hampson AJ, Grimaldi M, Axelrod J, Wink D: "Cannabidiol and (-)Delta9 tetrahydrocannabinol are neuroprotective antioxidants". Proc Natl Acad Sci USA. 1998;95:8268-73.
Thapa D, Cairns EA, Szczesniak AM, Toguri JT, Caldwell MD & Kelly M: "The Cannabinoids ?8THC, CBD, and HU-308 Act via Distinct Receptors to Reduce Corneal Pain and Inflammation". Cannabis and cannabinoid research, 2018;3(1), 11-20.
Mack A, Joy J: "Marijuana as Medicine? The Science Beyond the Controversy". Washington (DC): National Academies Press (US); 2000. 10 (216 pages).

(Continued)

*Primary Examiner* — Genevieve S Alley
(74) *Attorney, Agent, or Firm* — LUCAS & MERCANTI, LLP

(57) ABSTRACT

The present application relates to the field of nanoemulsions, in particular, cannabinoid-comprising nanoemulsions. The present disclosure provides cannabinoid (e.g., THC, CBD, CBDi or combinations of THC and CBD) comprising nanoemulsions that may optionally further comprise cyclosporine as methods of using the disclosed nanoemulsions to treat ophthalmic conditions such as dry eye. The disclosed formulations have significantly improved pharmaceutical stability in a variety of tested conditions when compared to conventional formulations.

13 Claims, No Drawings

(56) References Cited

OTHER PUBLICATIONS

Pacifici R, Marchei E, Salvatore F, Guandalini L, Busardo FP, Pichini S: "Evaluation of cannabinoids concentration and stability in standardized preparations of cannabis tea and cannabis oil by ultra-high performance liquid chromatography tandem mass spectrometry". Clin Chem Lab Med. Aug. 28, 2017;55 (10):1555-1563, Abstract only (2 pages).

\* cited by examiner

STABLE CANNABINOID-COMPRISING NANOEMULSIONS AND METHODS OF USING THE SAME

CROSS-REFERENCE TO RELATED APPLICATION

This specification claims priority to U.S. Provisional Application No. 63/065,756, filed on Aug. 14, 2020, the disclosure of which is incorporated herein by reference in its entirety.

FIELD OF THE INVENTION

The present disclosure relates to the field of nanoemulsion formulations and methods of using nanoemulsion formulations to treat diseases or disorders, e.g., ophthalmic disorders such as dry eye. In particular, the present disclosure relates to formulations comprising at least one cannabinoid and, in some embodiments, cyclosporine, as well as methods of using such formulations to treat diseases or disorders such as dry eye. In particular, the field relates to formulations comprising cannabinoids with much higher pharmaceutically stability than conventional formulations.

BACKGROUND OF THE INVENTION

The following discussion is merely provided to aid the reader in understanding the disclosure and is not admitted to describe or constitute prior art thereto.

I. Cannabinoids

A cannabinoid is one of a class of diverse chemical compounds that acts on cannabinoid receptors in cells and may include, but is not limited to, endocannabinoids (produced naturally in the body by animals, e.g., humans), the phytocannabinoids (found in cannabis and some other plants), and synthetic cannabinoids. Tetrahydrocannabinol (THC) and cannabidiol (CBD) are two of the most well-studied phytocannabinoids, as they are major constituents of the cannabis plant. There are at least 113 different cannabinoids that have been isolated from cannabis, and these cannabinoids have exhibited varied chemical and physiological effects.

Certain cannabinoids, particularly THC and CBD, have been studied for their application in reducing pain as a result of their anti-inflammatory properties.

Cannabidiol isolate (CBDi)/synthetic Cannabidiol (CBD) is a non-psychoactive compound found in the cannabis plant. The medical site, Medical News Today states that "CBD isolate [CBDi] is a form of CBD, or cannabidiol, which is a chemical compound present in the cannabis plant. Unlike full-spectrum CBD products, CBD isolate does not contain any THC the psychoactive component of cannabis." See, https://www.medicalnewstoday.com/articles/cbd-isolate#what-it-is, retrieved Aug. 12, 2020. CBD isolate (CBDi) is normally 99% pure because it has undergone various extraction and purification process. Synthetic Cannabidiol (CBD) which is chemically identical to CBDi, is also 99% pure and has same physical and chemical properties as CBDi. Synthetic CBD however is cannabidiol sourced from chemically synthesized material.

Although the exact medical implications are currently being investigated, CBD has shown promise as an analgesic, anticonvulsant, muscle relaxant, anxiolytic, antipsychotic and has shown neuroprotective, anti-inflammatory, and anti-oxidant activity, among other currently investigated uses. See, Laprairie R B, Bagher A M, Kelly M E, Denovan-Wright E M: Cannabidiol is a negative allosteric modulator of the cannabinoid CB1 receptor. Br J Pharmacol. 2015 October; 172 (20): 4790-805; and Pertwee R G: The diverse CB1 and CB2 receptor pharmacology of three plant cannabinoids: delta9-tetrahydrocannabinol, cannabidiol and delta9-tetrahydrocannabivarin. Br J Pharmacol. 2008 January; 153 (2): 199-215

II. Cyclosporine

Cyclosporine is an immunosuppressive drug believed to work by decreasing the function of lymphocytes. Beyond its use as an immunosuppressant, cyclosporine has also been used to treat keratoconjunctivitis sicca (dry eyes). Cyclosporine is a cyclic peptide of 11 amino acids; it contains a single D-amino acid, which is rarely encountered in nature. Unlike most peptides, cyclosporine is not synthesized by ribosomes. Cyclosporine is highly metabolized in humans and animals after ingestion. The metabolites, which include cyclosporine B, C, D, E, H, and L, have less than 10% of cyclosporine's immunosuppressant activity and are associated with kidney toxicity. Individual cyclosporine metabolites have been isolated and characterized but do not appear to be extensively studied.

Cyclosporine (CYC) is an immunomodulator with anti-inflammatory effects which helps in the treatment of dry eyes. Its exact mechanism of action is not known; however, research has shown that the drug works by increasing tears production. CYC was also shown to inhibit apoptosis, which is a significant therapeutic effect when used topically for the management of ocular surface disorders. See, e.g., Donnenfeld E, Pflugfelder S C. Topical ophthalmic cyclosporine: pharmacology and clinical uses. Surv Ophthalmol. 2009; 54:321-338; and Foulks G. Topical cyclosporine for treatment of ocular surface disease. Int Ophthalmol Clin. 2006; 46:105-122

III. Nanoemulsion Formulations

Ease of active pharmaceutical ingredient delivery is a key issue facing pharmaceutical companies that develop and attempt to commercialize therapeutic products. An active pharmaceutical ingredient (API) that is readily soluble in water, for example, is not difficult to formulate into a suitable dosage form. However, formulating poorly water-soluble therapeutic drugs into suitable dosage forms poses a significant challenge. This is because the human body is a water-based system; thus, as a condition of producing therapeutic activity, a drug must dissolve following administration.

Some poorly water-soluble API are never commercialized because they cannot be effectively solubilized, and therefore fail to exhibit acceptable in vivo therapeutic activity. Alternatively, the quantity of poorly water-soluble API required to be administered to achieve an acceptable level of therapeutic activity may be too great, given the poor water solubility of the agent, and result in unacceptable toxicity. Even if an API is formulated into a liquid, where the API is solubilized in a solvent, such dosage forms sometimes perform sub-optimally. For example, such dosage forms may have unpredictable properties or induce undesirable side effects. For instance, as noted below, cyclosporine is notoriously difficult to formulate, and even currently available ophthalmic formulations are associated with a number of side effects like pain and irritation, and the onset of therapeutic activity is slow, which may be due to the low concentration of cyclosporine in the formulation.

Nanoemulsions are a colloidal particulate system in the submicron size range acting as carriers of drug molecules. The size of the particle/globules in a nanoemulsion varies from about 10 to 1,000 nm. These carriers are solid spheres and their surface is amorphous and lipophilic.

Conventional wet milling techniques for making nanoemulsions produce a "bi-phasic" system in which the stabilized API nanoparticles are suspended in a liquid or aqueous media. However, wet milling of API has drawbacks, principally being the cost of the process. The added cost for formulating a poorly water-soluble API into a nanoparticulate composition utilizing wet milling can be prohibitive. Additionally, wet milling techniques are not well suited for processing amorphous or semi-amorphous APIs.

IV. Treatments for Dry Eye

Dry eye syndrome (DES), also known as keratoconjunctivitis sicca (KCS), is the condition in which an afflicted individual has dry eyes that may experience irritation, redness, and discharge, and the individual's eyes may be easily fatigued. Blurred vision may also occur, and symptoms can range from mild and occasional to severe and continuous. Without treatment, scarring of the cornea may occur in some cases.

While a variety of treatment options (e.g., supplemental lubrication with artificial tears or application of mild topical steroids or topical immunosuppressants such as cyclosporine (RESTASIS®) exist, the available treatments possess numerous drawbacks. For instance, currently available cyclosporine formulations like RESTASIS® commonly cause burning, redness, discharge, watery eyes, eye pain, foreign body sensation, itching, stinging, and blurred vision. Moreover, once a patient begins a dry eye treatment regimen that includes application of currently available cyclosporine formulations, it may take 3 months or more before the patient achieves any sign of clinical improvement.

It is believed that the addition of cannabinoids to CYC eye formulations is to help in the treatment of Intraocular pressure (IOP) associated with glaucoma. THC and CBD exert their effect by interacting with the body's endocannabinoid system. This system is made up on a network of receptors; two of these have been identified as. CB1. (Cannabinoid 1) an CB2 (Cannabinoid 2). CB1 receptors have been found to be present and functionally active in the iris-ciliary processes and the trabecular meshwork and retina. See, Porcella A, Casellas P, Gessa G L, Pani L. Cannabinoid receptor CB1 mRNA is highly expressed in the rat ciliary body: implications for the antiglaucoma properties of marihuana. Brain Res Mol Brain Res. 1998; 58:240-5; and Stamer W D, Golightly S F, Hosohata Y, Ryan E P, Porter A C, Varga E, et al. Cannabinoid CB (1) receptor expression, activation and detection of endogenous ligand in trabecular meshwork and ciliary process tissues. Eur J Pharmacol. 2001; 431:277-86.

CB2 receptors are present in the trabecular meshwork and retina. See, Heand F, Song Z H. Molecular and cellular changes induced by the activation of CB2 cannabinoid receptors in trabecular meshwork cells. Mol Vis. 2007; 13:1348-56 and Lu Q, Straiker A, Maguire G. Expression of CB2 cannabinoid receptor mRNA in adult rat retina. Vis Neurosci. 2000; 17:91-95.

Although the mode of action of THC hasn't been fully understood, it is believed to be a partial agonist of both CB1 and CB2 receptors present in the eye and these might be involved in its IOP lowering activity. See, He and F, Song Z H. Molecular and cellular changes induced by the activation of CB2 cannabinoid receptors in trabecular meshwork cells. Mol Vis. 2007; 13:1348-56 and Njie Y F, Qiao Z, Xiao Z, Wang W, Song Z H. Narachidonylethanolamide-induced increase in aqueous humor outflow facility. Invest Ophthalmol Vis Sci. 2008; 49:4528-34.

THC may also have an advantage over current antiglaucoma agents in that in addition to its IOP lowering activity it could act as a neuroprotectant through independent mechanisms. See, Hingorani T, Gul W, Elsohly M, Repka M A, Majumdar S. Effect of ion pairing on in vitro transcorneal permeability of a Delta (9)-tetrahydrocannabinol prodrug: potential in glaucoma therapy. J Pharm Sci. 2012; 101:616-26; and Hampson A J, Grimaldi M, Axelrod J, Wink D. Cannabidiol and (-)Delta9 tetrahydrocannabinol are neuroprotective antioxidants. Proc Natl Acad Sci USA. 1998; 95:8268-73.

Recent research indicates that direct topical application of cannabidiol (CBD) may be beneficial for neuropathic ocular pain. See, Thapa, D., Cairns, E. A., Szczesniak, A. M., Toguri, J. T., Caldwell, M. D., & Kelly, M. (2018). The Cannabinoids Δ8THC, CBD, and HU-308 Act via Distinct Receptors to Reduce Corneal Pain and Inflammation. Cannabis and cannabinoid research, 3 (1), 11-20. doi: 10.1089/can.2017.0041 The study showed that using CBD as a sole agent or in combination with other cannabinoids could be effective in the treatment of ocular pain and inflammation resulting from corneal surface injuries.

There are only two FDA approved drugs containing cannabinoids; Marinol®[1] and Epidiolex®[2]. Marinol® is an oral medication used by adults to treat loss of appetite associated with AIDS and nausea/vomiting associated with cancer treatment (chemotherapy). The active ingredient Dronabinol is a man-made form of cannabis. The recommended dosage varies per indication; for anorexia it is 2.5 mg used twice daily before lunch and dinner. For symptoms associated with chemotherapy the dosage is 5 mg used 1-3 hours before the start of treatment, then every 2 to 4 hours after treatment. The biggest setback of the drug is dronabinol's greasy consistency which makes the compound difficult and expensive to purify. Another major drawback of this formulation is that Marinol® has to be refrigerated and upon removal from refrigeration, it can be used for only up to 90 days. Also, because dronabinol does not dissolve readily in water, only a fraction of the orally ingested compound (about 10 to 20%) reaches the patient's circulation. See, Mack A, Joy J. Marijuana as Medicine? The Science Beyond the Controversy. Washington (DC): National Academies Press (US); 2000. 10, PHARMACEUTICALS FROM MARIJUANA. Available from: https://www.ncbi.nlm.nih.gov/books/NBK224399

[1]Marinol® is a registered trademark of Unimed Pharmaceuticals, Inc.
[2]Epidolex® is a registered trademark of GW Pharma Limited Corporation.

Epidiolex® is an oral cannabidiol solution used for the treatment of seizures associated with two rare and severe forms of epilepsy, Lennox-Gastaut syndrome and Dravet syndrome, in patients two years of age and older. It has a starting dosage of 2.5 mg/kg taken by mouth twice daily and a maintenance dosage of 5 mg/kg taken by mouth twice daily. A major setback of this drug is the stability; the shelf life is only 12 weeks.

Therefore, there is a market need for cannabinoid-based drugs having better and longer stability at room temperature as well as the need to avoid refrigeration of currently existing products. In addition, there is an impetus to develop a relatively easier production process of cannabinoid-based drugs.

Additionally, there is a need in the art for improved therapies using cannabinoid-based drugs for treating ophthalmic conditions such as dry eye that will provide patients with an alternative that does not cause irritation and has a faster therapeutic onset.

SUMMARY OF THE INVENTION

In one example, a formulation comprises a pharmaceutically acceptable oil having at least one oxidizable metal of less than one part per million in said oil, wherein the at least one oxidizable metal is one or more of the following: a copper content of less than one part per million in said oil; a chromium content of less than one part per million in said oil; a lithium content of less than one part per million in said oil; and a molybdenum content of less than one part per million in said oil; and at least one cannabinoid or a salt or derivative thereof dissolved in the pharmaceutically acceptable oil; the at least one cannabinoid or a salt or a derivative thereof having a weight percentage of up to 75% of the formulation. An exemplary weight percentage range of the at least one cannabinoid or a salt or a derivative is from 0.01% weight/by weight to 75% weight/weight of the formulation. The term "weight percentage" herein as used in the claims and the specification is intended to mean "weight/weight of the formulation." For example, if a cannabinoid is 75% of the formulation, this means 750 milligrams of cannabinoid per 1 gram of formulation of oil. The oil content is in the range of about 0.01% w/w to about 99% w/w of the at least one pharmaceutically acceptable oil having at least one oxidizable metal of less than one part per million in said oil.

In one example, the mentioned formulation is a nanoformulation and contains a pharmaceutically active agent. In an example, the pharmaceutically active agent is cyclosporine and the formulation comprises about 0.05% w/w to about 5% w/w of cyclosporine or a salt or a derivative as the pharmaceutically active agent thereof; about 0.01% w/w to about 50% w/w of the at least one cannabinoid or a salt or derivative thereof; at least one solvent; at least one pharmaceutically acceptable oil as previously described; at least one surfactant; and an aqueous phase; and the cyclosporine is present at least being (i) dissolved in globules of the at least one pharmaceutically acceptable oil and (ii) as solid nanoparticles suspended in the aqueous phase. In one example, the pharmaceutical formulation contains cyclosporine is in amount of about 0.05% w/w to about 5% w/w or a salt or a derivative and the at least one cannabinoid or a salt or derivative thereof is in an amount of about 0.01% w/w to about 50% w/w and also contains at least two cannabinoids, a) about 0.1% w/w to about 50% w/w of cannabidiol as a first the at least one cannabinoid or a salt or derivative thereof; and b) about 0.01% w/w to about 50% w/w of tetrahydrocannabinol as a second the at least one cannabinoid or a salt or derivative thereof.

In one example, the formulation is a nanoemulsion, which comprises about 0.05% w/w to about 5% w/w of cyclosporine or a salt or a derivative as the pharmaceutically active agent thereof; about 0.01% w/w to about 50% w/w of the at least one cannabinoid or a salt or derivative thereof; at least one solvent; about 3% w/w to about 80% w/w of the at least one pharmaceutically acceptable oil having at least one oxidizable metal of less than one part per million in said oil, wherein the at least one oxidizable metal is one or more of the following: a copper content of less than one part per million in said oil; a chromium content of less than one part per million in said oil; a lithium content of less than one part per million in said oil; and a molybdenum content of less than one part per million in said oil; at least one surfactant; and an aqueous phase; wherein cyclosporine is present at least being (i) dissolved in globules of the at least one pharmaceutically acceptable oil and (ii) as solid nanoparticles suspended in the aqueous phase.

In one example, a formulation comprises cyclosporine or a salt or derivative thereof and at least one cannabinoid or a salt or derivative thereof suspended in an emulsion. The emulsion comprises (a) an aqueous phase; (b) at least one pharmaceutically acceptable oil having at least one oxidizable metal of less than one part per million in said oil, wherein the at least one oxidizable metal is one or more of the following: a copper content of less than one part per million in said oil; a chromium content of less than one part per million in said oil; a lithium content of less than one part per million in said oil; and a molybdenum content of less than one part per million in said oil; (c) at least one organic solvent; (d) at least one surfactant; and optionally, a preservative or a pH adjusting agent and combinations thereof.

The exemplary cannabinoid can be THC or CBD, or CBD isolate (referred in the specification as "CBDi," for example, or combinations thereof. Other cannabinoids known in the art can be utilized.

Excipients are traditionally considered as pharmacologically inert chemicals that are used in various kinds of formulations. Excipients used in formulations can also actively participate in drug-excipient interactions that can eventually compromise the stability of the product and therapeutic role of the drug component(s) following drug decomposition. However, the magnitude of decomposition of the drug substance(s) highly depends on the chemical configuration, quantity of the drug, and physical and chemical properties of excipients used in the formulations. One of the major factors of oxidative degradation of drugs are metal ions present in excipients. To avoid metal induced oxidative decomposition of pharmaceutical drugs it is especially important to select appropriate excipients. The pharmaceutically acceptable oil has at least one oxidizable metal of less than one part per million in said oil, wherein the at least one oxidizable metal is one or more of the following a copper content of less than one part per million in said oil; a chromium content of less than one part per million in said oil; a lithium content of less than one part per million in said oil; and a molybdenum content of less than one part per million in said oil. The foregoing is a list of exemplary oxidizable metals found as impurities exceeding one part per million in many oils not utilized in the claimed invention. However, the list of oxidizable metals generally known in chemistry, is of course, not limited to those metals and include aluminum, magnesium, nickel, iron, by way of example.

In one example, the formulation comprises a concentration of CYC in a weight percentage at least 0.025% and a THC concentration up to 2%, and at least one pharmaceutically acceptable oil having heavy metal content of less than one part per million in the mentioned oil. In a preferred embodiment, the formulation comprises a concentration of CYC in a weight percentage at least 0.025% and a THC concentration up to 2%, and at least one pharmaceutically acceptable oil having at least one oxidizable metal of less than one part per million in said oil, wherein the at least one oxidizable metal is one or more of the following a copper content of less than one part per million in said oil; a chromium content of less than one part per million in said oil; a lithium content of less than one part per million in said oil; and a molybdenum content of less than one part per million in said oil.

In another example, the formulation comprises a concentration of CYC in a weight percentage at least 0.1% and a THC concentration up to 2%, and a CBD concentration of 0.3% and at least one pharmaceutically acceptable oil having at least one oxidizable metal of less than one part per million in said oil, wherein the at least one oxidizable metal is one or more of the following a copper content of less than one part per million in said oil; a chromium content of less than one part per million in said oil; a lithium content of less than one part per million in said oil; and a molybdenum content of less than one part per million in said oil.

In another example, the formulation comprises a concentration of CYC in a weight percentage at least 0.025%, a THC concentration up to 2%, and a CBD concentration of 5% with at least one pharmaceutically acceptable oil having at least one oxidizable metal of less than one part per million in said oil, wherein the at least one oxidizable metal is one or more of the following a copper content of less than one part per million in said oil; a chromium content of less than one part per million in said oil; a lithium content of less than one part per million in said oil; and a molybdenum content of less than one part per million in said oil.

In another example, the formulation comprises a concentration of CBD in a weight percentage at least 0.1% and up to maximum up to 75%, a THC in a weight percentage of at least 0.01% and concentration up to 50% and at least one pharmaceutically acceptable oil having at least one oxidizable metal of less than one part per million in said oil, wherein the at least one oxidizable metal is one or more of the following a copper content of less than one part per million in said oil; a chromium content of less than one part per million in said oil; a lithium content of less than one part per million in said oil; and a molybdenum content of less than one part per million in said oil.

In another example, the formulation comprises a concentration of CBD in a weight percentage at least 0.05%, and at least one pharmaceutically acceptable oil having at least one oxidizable metal of less than one part per million in said oil, wherein the at least one oxidizable metal is one or more of the following a copper content of less than one part per million in said oil; a chromium content of less than one part per million in said oil; a lithium content of less than one part per million in said oil; and a molybdenum content of less than one part per million in said oil.

In another example, the formulation comprises at least one cannabinoid at a weight percentage of at least 0.025% in combination with at least one steroid in a pharmaceutically acceptable oil having at least one oxidizable metal of less than one part per million in said oil, wherein the at least one oxidizable metal is one or more of the following a copper content of less than one part per million in said oil; a chromium content of less than one part per million in said oil; a lithium content of less than one part per million in said oil; and a molybdenum content of less than one part per million in said oil.

In one example, the formulation comprises at least one cannabinoid having a weight percentage of at least 0.025% in combination with at least one nonsteroidal anti-inflammatory drug in a pharmaceutically acceptable oil having at least one oxidizable metal of less than one part per million in said oil, wherein the at least one oxidizable metal is one or more of the following a copper content of less than one part per million in said oil; a chromium content of less than one part per million in said oil; a lithium content of less than one part per million in said oil; and a molybdenum content of less than one part per million in said oil.

For formulations of cyclosporine in combinations with cannabinoids of CBDi and THC, typical weight/weight percentages of formulation are as follows: 0.05 to 5% CYC, 0.1 to 50% CBDi and 0.01 to 50% THC. For formulations of cyclosporine in combination with CBDi, the typical weight/weight percentages of formulation are as follows: 0.05 to 5% CYC and 0.1 to 50% CBDi.

For such formulations of cyclosporine and formulations of cannabinoids without cyclosporine, the mentioned pharmaceutically acceptable oil may be in a weight/weight percentage of 3% to 80%. For such formulations of cyclosporine and formulations of cannabinoids without cyclosporine, the surfactant may be in a weight/weight percentage of 0.5 to 25% surfactant.

Such exemplary formulations can be for ophthalmic or oral or topical use, and combinations thereof. Any nonsteroidal anti-inflammatory drug known in the art can be used in combination with least one cannabinoid having a weight percentage of at least 0.025%, whether alone or in combination with other nonsteroidal anti-inflammatory drug in the mentioned pharmaceutically acceptable oils described above. As of the writing of this specification, the price of synthetic CBD which is very difficult to purchase from DEA-approved vendors is around $3000/gram versus $3/gram for CBDi. The applicant is the holder of an authorized DEA R & D registration. In the foregoing examples or any of the later examples described in the specification, CBD isolate (CBDi) is used primarily in the examples instead of synthetic CBD (CBD) for many reasons including the mentioned costs. There is no chemical difference between synthetic CBD and CBDi. For example, this CBDi utilization occurs for combinations with THC or in combinations with THC and CYC (cyclosporine) or with CYC (cyclosporine) alone.

Methods of treatment or foreseeable uses of the disclosed nanoemulsion formulations include treating ophthalmic conditions such as dry eye as well as using dermal applications for antiinflammatory conditions. Combining cannabinoids or a salt or derivative thereof and cyclosporine or a salt or derivative thereof into a formulation for treating ophthalmic conditions such as dry eye provides numerous benefits, including but not limited to, (i) decreasing pain, irritation, and other adverse events associated with administration of cyclosporine alone; (ii) decreasing the amount of time needed for therapeutic onset as compared to administration of cyclosporine alone; and (iii) allowing for higher doses of cyclosporine to be safely administered. Additionally, the disclosed formulations comprising at least one cannabinoid or a salt or derivative thereof (e.g., THC or CBD or CBDi), either alone or in combination with cyclosporine or a salt or derivative thereof, provide anti-inflammatory and analgesic effects when administered to the eye of a patient in need. CBD isolate can be replaced with synthetic CBD as well in any of these nanoformulations.

Accordingly, in one aspect, the present disclosure provides nanoemulsion formulations comprising at least one cannabinoid or a salt or derivative thereof formulated in an emulsion, the emulsion comprising an aqueous phase, at least one pharmaceutically acceptable oil, and at least one surfactant. The formulation can further comprise cyclosporine or a salt or derivative thereof.

In some embodiments, the formulation may further comprise at least one organic solvent. In some embodiments, the organic solvent may be an alcohol, such as for example, ethanol, methanol, isopropyl alcohol, glycerol, derivatives thereof, and any combination thereof.

In another aspect, the present disclosure provides nanoemulsion formulations comprising droplets having an average particle size of less than about 1 micron and (i) about 0.01 to about 2% (w/w) cyclosporine or a derivative or salt thereof; (ii) about 0.01 to about 5% (w/w) of at least one cannabinoid or a derivative or salt thereof; (iii) about 10 to about 90% (w/w) water; (iv) about 10 to about 60% (w/w) of at least one pharmaceutically acceptable oil; (v) about 1 to about 15% of at least one surfactant; and (vi) about 0.05 about 0.5% (w/w) of at least one organic solvent.

In some embodiments, the formulation may comprise droplets having an average particle size of less than about 1 micron and (i) about 0.01 to about 0.5% (w/w) cyclosporine or a derivative or salt thereof; (ii) about 0.01 to about 0.5% (w/w) of at least one cannabinoid or a derivative or salt thereof; (iii) about 10 to about 90% (w/w) water; (iv) about 10 to about 60% (w/w) of at least one pharmaceutically acceptable oil; (v) about 1 to about 15% (w/w) of at least one surfactant; and (vi) about 0.05 about 0.5% (w/w) of at least one organic solvent.

Another embodiment is directed to a nanoemulsion formulation comprising droplets having an average particle size of less than about 1 micron and: (i) about 0.01 to about 0.5% (w/w) tetrahydrocannabinol (THC) or a salt or derivative thereof; (ii) about 0.01 to about 0.5% (w/w) cannabidiol (CBD) or CBDi or a salt or derivative thereof; (iii) about 10 to about 90% (w/w) water; (iv) about 10 to about 60% (w/w) of at least one pharmaceutically acceptable oil; (v) about 1 to about 15% (w/w) of at least one surfactant; and (vi) about 0.05 to about 0.5% (w/w) of at least one organic solvent. The formulation can further comprise cyclosporine or a salt or derivative thereof.

In some embodiments, the emulsion droplet size may be selected from the group consisting of less than about 1 micron, less than about 900 nm, less than about 800 nm, less than about 700 nm, less than about 600 nm, less than about 500 nm, less than about 450 nm, less than about 400 nm, less than about 350 nm, less than about 300 nm, less than about 250 nm, less than about 200 nm, less than about 150 nm, and less than about 100 nm.

In some embodiments, the cyclosporine or a salt or derivative thereof can form particles that are suspended in the nanoemulsion, and these particles may have an average particle size selected from the group consisting of less than about 1 micron, less than about 900 nm, less than about 800 nm, less than about 700 nm, less than about 600 nm, less than about 500 nm, less than about 450 nm, less than about 400 nm, less than about 350 nm, less than about 300 nm, less than about 250 nm, less than about 200 nm, less than about 150 nm, and less than about 100 nm.

In some embodiments, the cyclosporine or a salt or derivative is present at a therapeutically effective amount, which can be at a concentration of about 0.01% to about 2.0%, 0.25% to about 0.05% (w/w), or 0.01 to about 0.5% (w/w), 0.025% to 2.0% (w/w), or any amount in-between these values.

In some embodiments, the cannabinoid may be present at a concentration of about 0.01% to about 10.0% (w/w), 0.01 to about 10.0% (w/w), or any amount in-between these values. In some embodiments, the at least one cannabinoid or a salt or derivative thereof may be tetrahydrocannabinol (THC), cannabidiol (CBD), CBDi, or a combination of THC and CBD or a combination of THC and CBDi. In some embodiments, THC may be present at a concentration of about 0.01% to about 10.0% (w/w) and CBD is present at a concentration of about 0.01% to about 10.0% (w/w). In one example, THC may be present at a concentration of about 0.1% (w/w) and CBD is present at a concentration of about 0.03% (w/w).

In some embodiments, the pharmaceutically acceptable oil is selected from the group consisting of almond oil, apricot seed oil, borage oil, canola oil, coconut oil, corn oil, cotton seed oil, fish oil, jojoba bean oil, lard oil, linseed oil (boiled), Macadamia nut oil, mineral oil, olive oil, peanut oil, Oil Brand A Safflower oil, sesame oil, soybean oil, squalene, sunflower seed oil, tricaprylin (1,2,3-trioctanoyl glycerol), and wheat germ oil. In some embodiments, the pharmaceutically acceptable oil may comprise a medium chain triglyceride (e.g., OIL B.

In other embodiments, the pharmaceutically acceptable oils have a copper content of less than one part per million in said oil; and a chromium content of less than one part per million in said oil.

In some embodiments, the surfactant may be a suitable ionic or non-ionic surfactant, such as a polysorbate or polyethylene glycol. In some embodiments, the polysorbate may be polysorbate 80. In some embodiments, two or more surfactants can be used. In one such example, polysorbate 20 and polysorbate 80 are used.

In some embodiments, the nanoemulsion formulation may further comprise a pharmaceutically acceptable preservative. Examples of useful preservatives include but are not limited to benzalkonium chloride (BKC) and/or methyl paraben. In some embodiments, the preservative may be in an amount of about 0.01 to about 0.1% (w/w).

In some embodiments, the formulation may be stable at room temperature for a period of time selected from the group consisting of at least about 3 months, at least about 4 months, at least about 5 months, at least about 6 months, at least about 7 months, at least about 8 months, about at least about 9 months, at least about 10 months, at least about 11 months, at least about 12 months, at least about 13 months, at least about 14 months, at least about 15 months, at least about 16 months, at least about 17 month, and at least about 18 months.

In some embodiments, the nanoformulation may be multiphasic or triphasic. For instance, in some embodiments, the cyclosporine or a salt or derivative thereof and/or at least one cannabinoid or a salt or derivative thereof may be present as (i) a suspension of nanoparticles in the oil phase; and (ii) dissolved in the aqueous phase, while in some embodiments, the cyclosporine and/or at least one cannabinoid may be present as (i) a suspension, (ii) dissolved in the oil phase, and (iii) dissolved in the aqueous phase.

In some embodiments of the foregoing aspects, the formulations described herein are ophthalmic formulations.

In another aspect, the present disclosure provides methods of treating ophthalmic conditions, including but not limited to dry eye, comprising administering to the eye of a subject in need a nanoemulsion formulation according to any one of the foregoing aspects or embodiments. A "subject in need" can be a subject with an ocular condition.

In some embodiments, a formulation comprising a combination of cyclosporine or a salt or derivative thereof, combined with at least one cannabinoid or a salt or derivative thereof, creates or results in less corneal irritation when administered to the eye of an individual as compared to a cyclosporine formulation that does not comprise at least one cannabinoid. This can be measured by, for example, an acute eye irritation/corrosion test in an animal.

In some embodiments, a formulation comprising a combination of cyclosporine or a salt or derivative thereof, combined with at least one cannabinoid or a salt or derivative thereof, may have a faster onset of therapeutic activity when administered to the eye of an individual as compared to a cyclosporine formulation that does not comprise at least one cannabinoid. This can be determined by, for example, an increase in aqueous tear production and other efficacy tests required by the U.S. FDA. For instance, in some embodiments, the onset of therapeutic activity occurs in a period of time selected from the group consisting of less than about 3 months, less than about 2 months, less than about 1 month, less than about 3 weeks, less than about 2 weeks, and less than about 1 week.

The foregoing general description and following detailed description are exemplary and explanatory and are intended to provide further explanation of the invention as claimed. Other objects, advantages, and novel features will be readily apparent to those skilled in the art from the following brief description of the drawings and detailed description of the invention.

DETAILED DESCRIPTION

The examples and drawings provided in the detailed description are merely examples and should not be used to limit the scope of the claims in any claim construction or interpretation.

The present disclosure provides novel nanoemulsion formulations comprising at least one cannabinoid or a salt or derivative thereof (e.g., THC or CBD), and, in some embodiments, an additional pharmaceutically active compound, such as cyclosporine or a salt or derivative thereof. The present disclosure also provides uses and methods or treatment of ophthalmic conditions, such as dry eye, utilizing the disclosed nanoemulsion formulations.

I. General Description of the Invention

The present invention provides composition and methods for treating ophthalmic conditions, such as but not limited to dry eye. The present invention provides dermal applications for antiinflammatory conditions, for example.

The disclosed formulations are unique in that the active compounds (e.g., cyclosporine, THC (Δ-9-Tetrahydrocannabinol), CBD (synthetic Cannabidiol), CBDi (CBD isolate) or salts or derivatives thereof) are multiphasic as a result of preparation using high pressure (i.e., >10,000 psi) homogenization. In other words, the active agents may be present in 3 phases of the nanoemulsion: (1) dissolved in the aqueous phase, (2) dissolved in the oil/lipophilic phase, and (3) in a particulate form in suspension in the aqueous and/or oil phases.

The disclosed formulations are exceptionally stable. For example, the compositions may be stable at room temperature for more than 3 months, whereas cannabinoids generally tend to become unstable and decompose within a matter of days after being placed in solution, even when held at 4° C.

From a clinical perspective, the disclosed formulations represent a significant improvement over prior topical ophthalmic treatments for conditions like dry eye. This is because the formulations described herein produce a faster onset of therapeutic activity and reduced irritation as compared to conventional products that include cyclosporine as the only pharmaceutically active compound (e.g., RESTASIS®).

Accordingly, the disclosed nanoemulsion as well as oil-only formulations that contain at least one cannabinoid such as CBDi or THC and uses/methods of treatment of ophthalmic conditions with the disclosed formulations provide a significant, unexpected benefit in the art. Methods of treatments utilizing at least one cannabinoid can be used for conditions other than ophthalmic.

II. Nanoemulsion Formulations

A. Cannabinoids

The nanoemulsions of the invention can comprise one or more cannabinoids, or a salt or derivative thereof. Cannabinoids are a class of biologically active molecules that can bind to and agonize the cannabinoid receptors CB1 and CB2. Cannabinoids may be isolated from the cannabis plant (e.g., THC and CBD), synthetically derived, or occur endogenously in mammals (e.g., anandamide, 2-AG, noladin ether, virodhamine, and N-arachidonyl dopamine (NADA)).

Tetrahydrocannabinol (THC), which is shown in Formula 1 below, and cannabidiol (CBD), which is shown in Formula 2 below, are among the most active cannabinoids that can be isolated from the cannabis plant. These two compounds possess anti-inflammatory properties and analgesic properties, and when combined, CBD has been shown to decrease the psychoactive effects of THC.

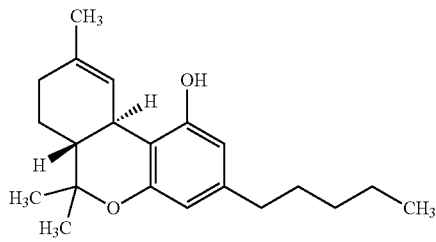

Formula 1

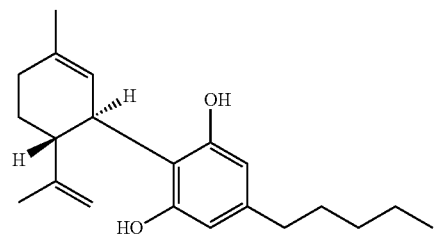

Formula 2

Cannabinoids, in general, and THC and CBD or CBDi, in particular, may be incorporated into the disclosed nanoemulsions for the treatment of ophthalmic conditions such as dry eye. Dry eye is associated with inflammation, irritation, and redness that can be directly addressed by the anti-inflammatory and analgesic properties of cannabinoids such as THC and/or CBD.

While the biological activity of cannabinoids such as THC and CBD and CBDi is attractive, the stability of these compounds has previously presented challenges. For instance, when incorporated into a solution as a tea, THC and CBD concentrations decreased by as much as 50% when stored at room temperature for 3-7 days, and similar decreases of up to 38% were seen in cannabis oil formulations OIL BRAND Ds the same timeframe (see, e.g., Pacifici et al., *Clin. Chem. Lab. Med.*, 55 (1): 1555-1563 (2017)). Thus, the practical application of these compounds remained challenging prior to the present disclosure. In contrast, the cannabinoid nanoemulsion formulations disclosed herein are stable for at least 3 months at room temperature, and may be stable for more than about 4 months, more than about 5 months, more than about 6 months, more than about 7 months, more than about 8 months, more than about 9, months, more than about 10 months, more than about 11 months, or more than about a year.

Any suitable amount of cannabinoid can be used in the disclosed nanoemulsion formulations. For example, the nanoemulsion formulation can comprise between about 0.01% and about 10% of at least one (i.e., one or two or three or more) cannabinoid. For example, in formulations containing both THC and CBD or CBDi, the formulation may comprise between about 0.01% and about 5% (w/w) THC and between about 0.01% and about 5% (w/w) CBD. Similarly, in formulations comprising only one of either THC or CBD or CBDi, the formulation may comprise between about 0.01% and about 10% (w/w) THC or between about 0.01% and about 10% (w/w) CBD or CBDi. Thus, in some embodiments the disclosed formulations may comprise about 0.01, about 0.02, about 0.03, about 0.04, about 0.05, about 0.06, about 0.07, about 0.08, about 0.09, about 0.1, about 0.2, about 0.3, about 0.4, about 0.5, about 0.6, about 0.7, about 0.8, about 0.9, about 1.0, about 1.05 about 1.1, about 1.15, about 1.2, about 1.25, about 1.3, about 1.35, about 1.4, about 1.45, about 1.5, about 1.55, about 1.6, about 1.65, about 1.7, about 1.75, about 1.8, about 1.85, about 1.9, about 1.95, about 2.0, about 2.05 about 2.1, about 2.15, about 2.2, about 2.25, about 2.3, about 2.35, about 2.4, about 2.45, about 2.5, about 2.55, about 2.6, about 2.65, about 2.7, about 2.75, about 2.8, about 2.85, about 2.9, about 2.95, about 3.0, about 3.05 about 3.1, about 3.15, about 3.2, about 3.25, about 3.3, about 3.35, about 3.4, about 3.45, about 3.5, about 3.55, about 3.6, about 3.65, about 3.7, about 3.75, about 3.8, about 3.85, about 3.9, about 3.95, about 4.0, about 4.05 about 4.1, about 4.15, about 4.2, about 4.25, about 4.3, about 4.35, about 4.4, about 4.45, about 4.5, about 4.55, about 4.6, about 4.65, about 4.7, about 4.75, about 4.8, about 4.85, about 4.9, about 4.95, or about 5.0% and up to 10% (w/w) of at least one (i.e., one or two or three or more) cannabinoid (e.g., THC and/or CBD or CBDi).

It should further be noted that when more than one cannabinoid is present in a formulation, the cannabinoids do not need to be incorporated in identical concentrations. In other words, when THC and CBD or CBDi are both present, the concentration of THC may be higher than the concentration of CBD or CBDi and vice versa. For example, in some embodiments, THC may be present at a concentration of about 0.1% to about 0.5% (w/w) and CBD or CBDi may be present at a concentration of about 0.01% to about 0.03% (w/w).

B. Cyclosporine

In one embodiment of the invention, the nanoemulsions described herein comprise cyclosporine or a salt or derivative thereof. Cyclosporine has traditionally been used as an immunosuppressant in patients that have received organ transplants. Ophthalmic formulations of cyclosporine (e.g., RESTASIS®) have also proven to be beneficial in treating dry eye. However, when used to treat dry eye, cyclosporine monotherapy has at least two clinical drawbacks. First, cyclosporine is known to cause irritation and pain when applied to the eyes. This irritation and pain usually does not subside over time and can threaten or completely undermine patient compliance. Second, because cyclosporine delivery using conventional ophthalmic formulations is inefficient, it may take more than 3-6 months of treatment before a given patient begins seeing a clinical improvement in the management of their dry eyes.

When incorporated into the disclosed nanoemulsion formulations, these clinical drawbacks are overcome. The analgesic properties of cannabinoids such as THC and CBD decrease the pain associated with cyclosporine application, and the anti-inflammatory properties of the cannabinoids decrease cyclosporine-induced irritation. Moreover, the multiphasic nature of the disclosed nanoemulsions, along with the small, uniform size of the globules and particles therein, makes the disclosed formulations less irritating and more palatable for patients.

Additionally, because cannabinoids such as THC and CBD can improve treatment of ophthalmic conditions such as dry eye directly and function via distinct mechanisms from cyclosporine, the disclosed formulations that incorporate cyclosporine will produce a clinical response much faster than an ophthalmic formulation that comprises cyclosporine alone. Indeed, the disclosed formulations may produce a significant clinical benefit or improvement in one or more signs or symptoms of dry eye in less than about 3 months, less than about 2.5 months, less than about 2 months, less than about 1.5 months, less than about 1 month, less than about 3 weeks, less than about 2 weeks, less than about 1 week, or with 1, 2, 3, 4, 5, 6, or 7 days of commencement of treatment with the disclosed compositions.

Moreover, because the combination of cyclosporine with at least one cannabinoid (e.g., THC and/or CBD or CBDi) decreases negative side effects of ophthalmic cyclosporine such as pain and irritation, a more cyclosporine may be included in the disclosed formulations than what is included in prior ophthalmic formulations that included cyclosporine without a cannabinoid. For instance, RESTASIS® is a 0.05% ophthalmic emulsion of cyclosporine.

In contrast, for the purposes of the present disclosure any suitable amount of cyclosporine can be used in the disclosed nanoemulsion formulations. For example, the nanoemulsion formulation can comprise between about 0.01% and about 5% (w/w) cyclosporine. Thus, the disclosed formulations may comprise about 0.025% to about 4.5% (w/w) cyclosporine, about 0.05% to about 4% (w/w) cyclosporine, about 0.075% to about 3.5% (w/w) cyclosporine, about 0.1% to about 3% (w/w) cyclosporine, about 0.25% to about 2.5% (w/w) cyclosporine, about 0.5% to about 2% (w/w) cyclosporine, about 0.75% to about 1% (w/w) cyclosporine or a salt or derivative thereof, or any percent range in between any of these concentration ranges. Thus, in some embodiments the disclosed formulations may comprise about 0.01, about 0.02, about 0.03, about 0.04, about 0.05, about 0.06, about 0.07, about 0.08, about 0.09, about 0.1, about 0.2, about 0.3, about 0.4, about 0.5, about 0.6, about 0.7, about 0.8, about 0.9, about 1.0, about 1.05 about 1.1, about 1.15, about 1.2, about 1.25, about 1.3, about 1.35, about 1.4, about 1.45, about 1.5, about 1.55, about 1.6, about 1.65, about 1.7, about 1.75, about 1.8, about 1.85, about 1.9, about 1.95, about 2.0, about 2.05 about 2.1, about 2.15, about 2.2, about 2.25, about 2.3, about 2.35, about 2.4, about 2.45, about 2.5, about 2.55, about 2.6, about 2.65, about 2.7, about 2.75, about 2.8, about 2.85, about 2.9, about 2.95, about 3.0, about 3.05 about 3.1, about 3.15, about 3.2, about 3.25, about 3.3, about 3.35, about 3.4, about 3.45, about 3.5, about 3.55, about 3.6, about 3.65, about 3.7, about 3.75, about 3.8, about 3.85, about 3.9, about 3.95, about 4.0, about 4.05 about 4.1, about 4.15, about 4.2, about 4.25, about 4.3, about 4.35, about 4.4, about 4.45, about 4.5, about 4.55, about 4.6, about 4.65, about 4.7, about 4.75, about 4.8, about 4.85, about 4.9, about 4.95, or up to 10.0% (w/w) of cyclosporine or a salt or derivative thereof.

It should also be noted that multiple cyclosporine compounds are known in the art, including cyclosporine A, B, C, D, E, H, and L. The presently disclosed nanoemulsion formulations can incorporate any of these cyclosporine compounds, including salts and derivatives thereof. Unless indicated to the contrary, the term "cyclosporine" is understood to be cyclosporine A, which is shown in Formula 3 below.

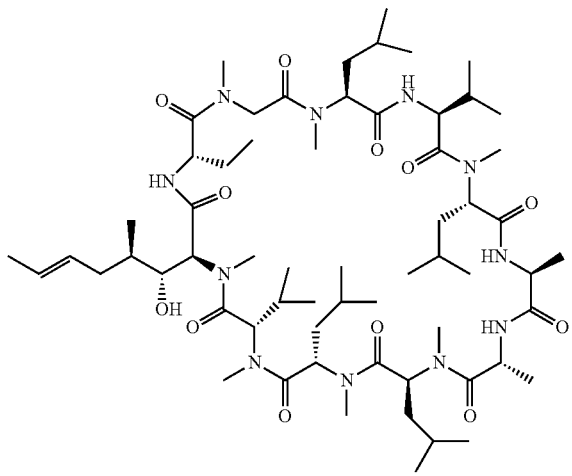

Formula 3

C. Nanoemulsion

As described above, the compositions of the invention comprise a nanoemulsion combined with at least one cannabinoid or a salt or derivative thereof (e.g., THC and/or CBD or CBDi) and, optionally, cyclosporine or a salt or derivative thereof to make a nanoemulsion formulation useful for treating ophthalmic conditions such as dry eye. The nanoemulsion formulations may comprise an aqueous phase, an oil/lipophilic phase, at least one solvent, and/or at least one surfactant.

Nanoemulsions of the present disclosure can be produced, for example, using high pressure homogenization. High energy input, through high velocity homogenization or vigorous stirring, is a preferred process. The high energy processes reduce the size of the emulsion droplets, thereby exposing a large surface area to the surrounding aqueous environment. High shear processes are preferred, as low shear processes can result in larger particle/droplet sizes. Accordingly, in some embodiments the disclosed nanoemulsions may be produced by submitting a mixture comprising an aqueous phase, oil phase, and at least one cannabinoid or a salt or derivative thereof and, optionally, cyclosporine or a salt or derivative thereof to multiple rounds (e.g., 2, 3, 4, 5, 6, 7, 8, 9, or 10 or more) of high-pressure homogenization.

High pressure homogenization includes homogenization at pressures greater than about 10,000 psi, for example, about 11,000 or more; about 12,000 or more; about 13,000 or more; about 14,000 or more; about 15,000 or more; about 16,000 or more; about 17,000 or more; about 18,000 or more; about 19,000 or more; about 20,000 or more; about 21,000 or more; about 22,000 or more; about 23,000 or more; about 24,000 or more; about 25,000 or more; about 30,000 or more; about 35,000 or more; or about 40,000 or more psi.

In some embodiments, the disclosed nanoemulsion formulations may undergo multiple rounds of extrusion or homogenization at high pressure to obtain a product with consistent, unimodal particle/globule size distribution and a desirable average globule or particle size. Thus, the formulations may undergo 1, 2, 3, 4, 5, 6, 7, 8, 9, 10, 11, 12, 13, 14, or 15 or more rounds of extrusion or homogenization at high pressure homogenization.

The disclosed high pressure/high shear processes produce nanoemulsion formulations that are uniquely multiphasic-meaning the active compounds (e.g., THC, CBD, cyclosporine) may be (i) dissolved in the aqueous phase, (ii) dissolved in the oil/lipid phase, and (iii) suspended in a particulate form in the aqueous and/or oil/lipid phase. Moreover, the formulations are exceptionally stable. For the purposes of the present disclosure, the terms "stability" or "stable" are intended to mean that the formulation does not separate or precipitate and that the globule and particle sizes do not increase more than 15% over a given period of time. Additionally, "stability" can be indicated by the ability of the formulation to prevent loss or degradation of the active products, such as THC, CBD, and/or cyclosporine. For example, a stable nanoemulsion formulation may see a decrease of less than about 10, less than about 9, less than about 8, less than about 7, less than about 6, less than about 5, less than about 4, less than about 3, less than about 2, or less than about 1% of an active compound after storage for a given period of time (e.g., 3-4 months) at a given temperature (e.g., room temperature).

In some embodiments, the disclosed nanoemulsion formulations can be stable at about 20° C. to about 25° C. (i.e., "room temperature") for a time period of at least up to about 1 month, at least up to about 2 months, at least up to about 3 months, at least up to about 4 months, at least up to about 5 months, at least up to about 6 months, at least up to about 7 months, at least up to about 8 months, at least up to about 9 months, at least up to about 10 months, at least up to about 11 months, at least up to about 12 months, at least up to about 18 months, at least up to about 2 years, at least up to about 2.5 years, at least up to about 3 years, at least up to about 3.5 years, at least up to about 4 years, at least up to about 4.5 years, at least up to about 5 years, at least up to about 5.5 years, at least up to about 6 years, at least up to about 6.5 years, or at least up to about 7 years.

In some embodiments, the disclosed nanoemulsion formulations can be stable at about 4° C. for a time period of at least up to about 1 month, at least up to about 3 months, at least up to about 6 months, at least up to about 12 months, at least up to about 18 months, at least up to about 2 years, at least up to about 2.5 years, at least up to about 3 years, at least up to about 3.5 years, at least up to about 4 years, at least up to about 4.5 years, at least up to about 5 years, at least up to about 5.5 years, at least up to about 6 years, at least up to about 6.5 years, or at least up to about 7 years.

In some embodiments, the disclosed nanoemulsion formulations can be stable at about-20° C. for a time period of at least up to about 1 month, at least up to about 3 months, at least up to about 6 months, at least up to about 12 months, at least up to about 18 months, at least up to about 2 years, at least up to about 2.5 years, at least up to about 3 years, at least up to about 3.5 years, at least up to about 4 years, at least up to about 4.5 years, at least up to about 5 years, at least up to about 5.5 years, at least up to about 6 years, at least up to about 6.5 years, or at least up to about 7 years.

i. Aqueous Phase

The aqueous phase can comprise any type of aqueous phase including, but not limited to, water (e.g., $H_2O$, distilled water, purified water, water for injection, de-ionized water, tap water) and solutions (e.g., phosphate buffered saline (PBS) solution). In certain embodiments, the aqueous phase comprises water at a pH of about 4 to 10, or about 6 to 8. For example, the pH may be about 4, about 5, about 6, about 7, about 8, about 9, or about 10. The water can be deionized (hereinafter "DiH$_2$O"). In some embodiments the aqueous phase comprises phosphate buffered saline (PBS). The aqueous phase may further be sterile and pyrogen free.

The aqueous phase of the formulation may make up about 10% to about 60% (w/w) of the formulation, about 20% to about 50% (w/w) of the formulation, or about 30% to about 40% (w/w) of the formulation. For example, the aqueous phase may be about 10%, about 15%, about 20%, about 25%, about 30%, about 35%, about 40%, about 45%, about 50%, about 55%, or about 60% (w/w) of the formulation.

ii. Oil Phase

The oil in the nanoemulsion formulations of the present disclosure can be any cosmetically or pharmaceutically acceptable oil. The oil can be volatile or non-volatile, and may be chosen from animal oil, vegetable oil, natural oil, synthetic oil, hydrocarbon oils, silicone oils, semi-synthetic derivatives thereof, and combinations thereof.

The presently disclosed nanoemulsions are not limited to particular oil. A variety of oils are contemplated, including, but not limited to, sesame, soybean, avocado, squalene, olive, canola, corn, rapeseed, Oil Brand A Safflower, sunflower, fish, flavor, and water insoluble vitamins. Suitable oils include, but are not limited to, mineral oil, squalene oil, flavor oils, silicon oil, essential oils, water insoluble vitamins, Isopropyl stearate, Butyl stearate, Octyl palmitate, Cetyl palmitate, Tridecyl behenate, Diisopropyl adipate, Dioctyl sebacate, Menthyl anthranhilate, Cetyl octanoate, Octyl salicylate, Isopropyl myristate, neopentyl glycol dicarpate cetols, Ceraphyls®, Decyl oleate, diisopropyl adipate, $C_{12\text{-}15}$ alkyl lactates, Cetyl lactate, Lauryl lactate, Isostearyl neopentanoate, Myristyl lactate, Isocetyl stearoyl stearate, Octyldodecyl stearoyl stearate, Hydrocarbon oils, Isoparaffin, Fluid paraffins, Isododecane, Petrolatum, Argan oil, Canola oil, Chile oil, Coconut oil, corn oil, Cottonseed oil, Flaxseed oil, Grape seed oil, Mustard oil, Olive oil, Palm oil, Palm kernel oil, Peanut oil, Pine seed oil, Poppy seed oil, Pumpkin seed oil, Rice bran oil, Oil Brand A Safflower oil, Tea oil, Truffle oil, Vegetable oil, Apricot (kernel) oil, Jojoba oil (*Simmondsia chinensis* seed oil), Grapeseed oil, Macadamia oil, Wheat germ oil, Almond oil, Rapeseed oil, Gourd oil, Soybean oil, Sesame oil, Hazelnut oil, Maize oil, Sunflower oil, Hemp oil, Bois oil, Kuki nut oil, Avocado oil, Walnut oil, Fish oil, berry oil, allspice oil, juniper oil, seed oil, almond seed oil, anise seed oil, celery seed oil, cumin seed oil, nutmeg seed oil, leaf oil, basil leaf oil, bay leaf oil, cinnamon leaf oil, common sage leaf oil, *Eucalyptus* leaf oil, lemon grass leaf oil, *Melaleuca* leaf oil, oregano leaf oil, patchouli leaf oil, peppermint leaf oil, pine needle oil, rosemary leaf oil, spearmint leaf oil, tea tree leaf oil, thyme leaf oil, wintergreen leaf oil, flower oil, chamomile oil, clary sage oil, clove oil, geranium flower oil, hyssop flower oil, jasmine flower oil, lavender flower oil, manuka flower oil, Marhoram flower oil, orange flower oil, rose flower oil, ylang-ylang flower oil, Bark oil, *Cassia* Bark oil, cinnamon bark oil, *Sassafras* Bark oil, Wood oil, camphor wood oil, cedar wood oil, rosewood oil, sandalwood oil), rhizome (ginger) wood oil, resin oil, frankincense oil, myrrh oil, peel oil, bergamot peel oil, grapefruit peel oil, lemon peel oil, lime peel oil, orange peel oil, tangerine peel oil, root oil, valerian oil, Oleic acid, Linoleic acid, Oleyl alcohol, Isostearyl alcohol, semi-synthetic derivatives thereof, and any combinations thereof.

In some embodiments, the oil phase may comprise at least one medium chain triglyceride (MCT). MCTs are triglycerides whose fatty acids have an aliphatic tail of 6-12 carbon atoms. The fatty acids found in MCTs are called medium-chain fatty acids (MCFAs). Like all triglycerides, MCTs are composed of a glycerol backbone and three fatty acids. In the case of MCTs, 2 or 3 of the fatty acid chains attached to glycerol are of medium length. Common MCFAs include caproic acid, caprlylic acid, capric acid, lauric acid, and sources commonly used for extraction of natural MCTs include palm kernal oil, and coconut oil.

In some embodiments, the oil phase may comprise a commercially available lipid or lipid mixture, which can include but are not limited to an emollient ester, PPG-3 benzyl ether myristate, stearyl heptanoate, stearyl caprylate, propylene glycol dicaprylocaprate, and medium chain triglycerides.

The oil may further comprise a silicone component, such as a volatile silicone component, which can be the sole oil in the silicone component or can be combined with other silicone and non-silicone, volatile and non-volatile oils. Suitable silicone components include, but are not limited to, methylphenylpolysiloxane, simethicone, dimethicone, phenyltrimethicone (or an organomodified version thereof), alkylated derivatives of polymeric silicones, cetyl dimethicone, lauryl trimethicone, hydroxylated derivatives of polymeric silicones, such as dimethiconol, volatile silicone oils, cyclic and linear silicones, cyclomethicone, derivatives of cyclomethicone, hexamethylcyclotrisiloxane, octamethylcyclotetrasiloxane, decamethylcyclopentasiloxane, volatile linear dimethylpolysiloxanes, isohexadecane, isoeicosane, isotetracosane, polyisobutene, isooctane, isododecane, semi-synthetic derivatives thereof, and combinations thereof.

A volatile oil of the invention can be the organic solvent, or the volatile oil can be present in addition to an organic solvent. Suitable volatile oils include, but are not limited to, a terpene, monoterpene, sesquiterpene, carminative, azulene, menthol, camphor, thujone, thymol, nerol, linalool, limonene, geraniol, perillyl alcohol, nerolidol, farnesol, ylangene, bisabolol, farnesene, ascaridole, *Chenopodium* oil, citronellal, citral, citronellol, chamazulene, yarrow, guaiazulene, chamomile, semi-synthetic derivatives, or combinations thereof.

The oil/lipid phase of the formulation may make up about 10% to about 70% (w/w) of the formulation, about 20% to about 50% (w/w) of the formulation, or about 30% to about 40% (w/w) of the formulation. For example, the oil phase may be about 10%, about 15%, about 20%, about 25%, about 30%, about 35%, about 40%, about 45%, about 50%, about 55%, or about 70% (w/w) of the formulation.

iii. Solvents

A nanoemulsion of the present disclosure is also not limited to a particular solvent, such as an organic solvent. A variety of solvents are contemplated including, but not limited to, an alcohol (e.g., including, but not limited to, methanol, ethanol, propanol, and octanol), glycerol, isopropyl myristate, triacetin, N-methyl pyrrolidinone, aliphatic or aromatic alcohols, polyethylene glycols, propylene glycol, and an organic phosphate based solvent.

Organic solvents that may be incorporated into the disclosed nanoemulsion formulations include, but are not limited to, $C_1$-$C_{12}$ alcohol, diol, triol, dialkyl phosphate, trialkyl phosphate, such as tri-n-butyl phosphate, semi-synthetic derivatives thereof, and combinations thereof. In some embodiments, the solvent may be a nonpolar solvent, a polar solvent, a protic solvent, or an aprotic solvent.

Suitable organic solvents for the disclosed nanoemulsion formulations may include, but are not limited to, ethanol, methanol, isopropyl alcohol, glycerol, medium chain triglycerides, diethyl ether, ethyl acetate, acetone, dimethyl sulfoxide (DMSO), acetic acid, n-butanol, butylene glycol, perfumers alcohols, isopropanol, n-propanol, formic acid, propylene glycols, glycerol, sorbitol, industrial methylated spirit, triacetin, hexane, benzene, toluene, diethyl ether, chloroform, 1,4-dixoane, tetrahydrofuran, dichloromethane, acetone, acetonitrile, dimethylformamide, dimethyl sulfoxide, formic acid, semi-synthetic derivatives thereof, and any combination thereof. In one embodiment, the solvent is ethanol. In another embodiment, the solvent is methanol. In yet another embodiment, the solvent is isopropyl alcohol. Alternatively, the embodiments include combinations of one and more solvents such as ethanol and methanol.

The solvent may make up about 0.05% to about 0.5% of the formulation, about 0.1% to about 0.4% of the formulation, or about 0.2% to about 0.3% of the formulation. For example, the solvent may be about 0.05%, about 0.1%, about 0.15%, about 0.2%, about 0.25%, about 0.3%, about 0.35%, about 0.4%, about 0.45%, or about 0.5% of the formulation.

iv. Surfactants

In some embodiments, the disclosed nanoemulsion formulations may further comprise a surfactant. The present disclosure is not limited to a particular surfactant. A variety of surfactants are contemplated including, but not limited to, nonionic and ionic surfactants (e.g., TRITON X-100, polysorbate 20, polysorbate 80, and tyloxapol).

The surfactant in the disclosed nanoemulsion formulations can be a pharmaceutically acceptable ionic surfactant, a pharmaceutically acceptable nonionic surfactant, a pharmaceutically acceptable cationic surfactant, a pharmaceutically acceptable anionic surfactant, a pharmaceutically acceptable zwitterionic surfactant, or any combination thereof.

In some embodiments, the disclosed nanoemulsion formulations can comprise a cationic surfactant such as cetylpyridinium chloride (CPC).

In some embodiments, the disclosed nanoemulsion formulations comprises a nonionic surfactant, such as a polysorbate surfactant, which may be polysorbate 80 or polysorbate 20, and may have a concentration of about 1% to about 15%, (w/w) or about 5% to about 10% (w/w).

Exemplary useful surfactants are further described in *Applied Surfactants: Principles and Application*, Tharwat F. Tadros (Wiley-VCH Verlag GmbH & Co., KGaA, Weinheim ISBN: 3-527-30629-3 (2005)), which is specifically incorporated by reference.

Useful surfactants can be a pharmaceutically acceptable ionic polymeric surfactant, a pharmaceutically acceptable nonionic polymeric surfactant, a pharmaceutically acceptable cationic polymeric surfactant, a pharmaceutically acceptable anionic polymeric surfactant, or a pharmaceutically acceptable zwitterionic polymeric surfactant. Examples of polymeric surfactants include, but are not limited to, a graft copolymer of a poly(methyl methacrylate) backbone with multiple (at least one) polyethylene oxide (PEO) side chain, polyhydroxystearic acid, an alkoxylated alkyl phenol formaldehyde condensate, a polyalkylene glycol modified polyester with fatty acid hydrophobes, a polyester, semi-synthetic derivatives thereof, or combinations thereof.

Surface active agents or surfactants, are amphipathic molecules that consist of a non-polar hydrophobic portion, usually a straight or branched hydrocarbon or fluorocarbon chain containing 8-18 carbon atoms, attached to a polar or ionic hydrophilic portion. The hydrophilic portion can be nonionic, ionic or zwitterionic. The hydrocarbon chain interacts weakly with the water molecules in an aqueous environment, whereas the polar or ionic head group interacts strongly with water molecules via dipole or ion-dipole interactions. Based on the nature of the hydrophilic group, surfactants are classified into anionic, cationic, zwitterionic, nonionic and polymeric surfactants.

Suitable surfactants include, but are not limited to, ethoxylated nonylphenol comprising 9 to 10 units of ethyleneglycol, ethoxylated undecanol comprising 8 units of ethyleneglycol, polyoxyethylene (20) sorbitan monolaurate, polyoxyethylene (20) sorbitan monopalmitate, polyoxyethylene (20) sorbitan monostearate, polyoxyethylene (20) sorbitan monooleate, sorbitan monolaurate, sorbitan monopalmitate, sorbitan monostearate, sorbitan monooleate, ethoxylated hydrogenated ricin oils, sodium laurylsulfate, a diblock copolymer of ethyleneoxyde and propyleneoxyde, Ethylene Oxide-Propylene Oxide Block Copolymers, and tetra-functional block copolymers based on ethylene oxide and propylene oxide, Glyceryl monoesters, Glyceryl caprate, Glyceryl caprylate, Glyceryl cocate, Glyceryl erucate, Glyceryl hydroxysterate, Glyceryl isostearate, Glyceryl lanolate, Glyceryl laurate, Glyceryl linolate, Glyceryl myristate, Glyceryl oleate, Glyceryl PABA, Glyceryl palmitate, Glyceryl ricinoleate, Glyceryl stearate, Glyceryl thiglycolate, Glyceryl dilaurate, Glyceryl dioleate, Glyceryl dimyristate, Glyceryl disterate, Glyceryl sesuioleate, Glyceryl stearate lactate, Polyoxyethylene cetyl/stearyl ether, Polyoxyethylene cholesterol ether, Polyoxyethylene laurate or dilaurate, Polyoxyethylene stearate or distearate, polyoxyethylene fatty ethers, Polyoxyethylene lauryl ether, Polyoxyethylene stearyl ether, polyoxyethylene myristyl ether, a steroid, Cholesterol, Betasitosterol, Bisabolol, fatty acid esters of alcohols, isopropyl myristate, Aliphati-isopropyl n-butyrate, Isopropyl n-hexanoate, Isopropyl n-decanoate, Isproppyl palmitate, Octyldodecyl myristate, alkoxylated alcohols, alkoxylated acids, alkoxylated amides, alkoxylated sugar derivatives, alkoxylated derivatives of natural oils and waxes, polyoxyethylene polyoxypropylene block copolymers, nonoxynol-14, PEG-8 laurate, PEG-6 Cocoamide, PEG-20 methylglucose sesquistearate, PEG40 lanolin, PEG-40 castor oil, PEG-40 hydrogenated castor oil, polyoxyethylene fatty ethers, glyceryl diesters, polyoxyethylene stearyl ether, polyoxyethylene myristyl ether, and polyoxyethylene lauryl ether, glyceryl dilaurate, glyceryl dimystate, glyceryl distearate, semi-synthetic derivatives thereof, or mixtures thereof.

Additional suitable surfactants include, but are not limited to, non-ionic lipids, such as glyceryl laurate, glyceryl myristate, glyceryl dilaurate, glyceryl dimyristate, semi-synthetic derivatives thereof, and mixtures thereof.

In additional embodiments, the surfactant is a polyoxyethylene fatty ether having a polyoxyethylene head group ranging from about 2 to about 100 groups, or an alkoxylated alcohol having the structure $R_5$—$(OCH_2CH_2)_y$—OH, wherein $R^5$ is a branched or unbranched alkyl group having from about 6 to about 22 carbon atoms and y is between about 4 and about 100, and preferably, between about 10 and about 100. Preferably, the alkoxylated alcohol is the species wherein $R^5$ is a lauryl group and y has an average value of 23.

In a different embodiment, the surfactant is an alkoxylated alcohol which is an ethoxylated derivative of lanolin alcohol. Preferably, the ethoxylated derivative of lanolin alcohol is laneth-10, which is the polyethylene glycol ether of lanolin alcohol with an average ethoxylation value of 10.

Nonionic surfactants include, but are not limited to, an ethoxylated surfactant, an alcohol ethoxylated, an alkyl phenol ethoxylated, a fatty acid ethoxylated, a monoalkaolamide ethoxylated, a sorbitan ester ethoxylated, a fatty amino ethoxylated, an ethylene oxide-propylene oxide copolymer, Bis(polyethylene glycol bis [imidazoyl carbonyl]), nonoxynol-9, Bis(polyethylene glycol bis [imidazoyl carbonyl]), Brij® 35, Brij® 56, Brij® 72, Brij® 76, Brij® 92V, Brij® 97, Brij® 58P, Cremophor® EL, Decaethylene glycol monododecyl ether, N-Decanoyl-N-methylglucamine, n-Decyl alpha-D-glucopyranoside, Decyl beta-D-maltopyranoside, n-Dodecanoyl-N-methylglucamide, n-Dodecyl alpha-D-maltoside, n-Dodecyl beta-D-maltoside, n-Dodecyl beta-D-maltoside, Heptaethylene glycol monodecyl ether, Heptaethylene glycol monododecyl ether, Heptaethylene glycol monotetradecyl ether, n-Hexadecyl beta-D-maltoside, Hexaethylene glycol monododecyl ether, Hexaethylene glycol monohexadecyl ether, Hexaethylene glycol monooctadecyl ether, Hexaethylene glycol monotetradecyl ether, Igepal CA-630, Igepal CA-630, Methyl-6-O—(N-heptylcarbamoyl)-alpha-D-glucopyranoside, Nonaethylene glycol monododecyl ether, N-Nonanoyl-N-methylglucamine, N-Nonanoyl-N-methylglucamine, Octaethylene glycol monodecyl ether, Octaethylene glycol monododecyl ether, Octaethylene glycol monohexadecyl ether, Octaethylene glycol monooctadecyl ether, Octaethylene glycol monotetradecyl ether, Octyl-beta-D-glucopyranoside, Pentaethylene glycol monodecyl ether, Pentaethylene glycol monododecyl ether, Pentaethylene glycol monohexadecyl ether, Pentaethylene glycol monohexyl ether, Pentaethylene glycol monooctadecyl ether, Pentaethylene glycol monooctyl ether, Polyethylene glycol diglycidyl ether, Polyethylene glycol ether W-1, Polyoxyethylene 10 tridecyl ether, Polyoxyethylene 100 stearate, Polyoxyethylene 20 isohexadecyl ether, Polyoxyethylene 20 oleyl ether, Polyoxyethylene 40 stearate, Polyoxyethylene 50 stearate, Polyoxyethylene 8 stearate, Polyoxyethylene bis(imidazolyl carbonyl), Polyoxyethylene 25 propylene glycol stearate, Saponin from Quillaja bark, Span® 20, Span® 40, Span® 60, Span® 65, Span® 80, Span® 85, Tergitol, Type 15-S-12, Tergitol, Type 15-S-30, Tergitol, Type 15-S-5, Tergitol, Type 15-S-7, Tergitol, Type 15-S-9, Tergitol, Type NP-10, Tergitol, Type NP-4, Tergitol, Type NP-40, Tergitol, Type NP-7, Tergitol, Type NP-9, Tergitol, Tergitol, Type TMN-10, Tergitol, Type TMN-6, Tetradecyl-beta-D-maltoside, Tetraethylene glycol monodecyl ether, Tetraethylene glycol monododecyl ether, Tetraethylene glycol monotetradecyl ether, Triethylene glycol monodecyl ether, Triethylene glycol monododecyl ether, Triethylene glycol monohexadecyl ether, Triethylene glycol monooctyl ether, Triethylene glycol monotetradecyl ether, Triton® CF-21, Triton® CF-32, Triton® DF-12, Triton® DF-16, Triton® GR-5M, Triton® QS-15, Triton® QS-44, Triton® X-100, Triton® X-102, Triton® X-15, Triton® X-151, Triton® X-200, Triton® X-207, Triton® X-100, Triton® 114, Triton® X-165, Triton® X-305, Triton® X-405, Triton® X-45, Triton® X-705-70, Tween® 20, Tween® 21, Tween® 40, Tween® 60, Tween® 61, Tween® 65, Tween® 80, Tween 81, Tween® 85, Tyloxapol, n-Undecyl beta-D-glucopyranoside, semi-synthetic derivatives thereof, or combinations thereof.

In addition, the nonionic surfactant can be a poloxamer. Poloxamers are polymers made of a block of polyoxyethylene, followed by a block of polyoxypropylene, followed by a block of polyoxyethylene. The average number of units of polyoxyethylene and polyoxypropylene varies based on the number associated with the polymer. For example, the smallest polymer, Poloxamer 101, consists of a block with an average of 2 units of polyoxyethylene, a block with an average of 16 units of polyoxypropylene, followed by a block with an average of 2 units of polyoxyethylene. Poloxamers range from colorless liquids and pastes to white solids. In cosmetics and personal care products, Poloxamers are used in the formulation of skin cleansers, bath products, shampoos, hair conditioners, mouthwashes, eye makeup remover and other skin and hair products. Examples of Poloxamers include, but are not limited to, Poloxamer 101, Poloxamer 105, Poloxamer 108, Poloxamer 122, Poloxamer 123, Poloxamer 124, Poloxamer 181, Poloxamer 182, Poloxamer 183, Poloxamer 184, Poloxamer 185, Poloxamer 188, Poloxamer 212, Poloxamer 215, Poloxamer 217, Poloxamer 231, Poloxamer 234, Poloxamer 235, Poloxamer 237, Poloxamer 238, Poloxamer 282, Poloxamer 284, Poloxamer 288, Poloxamer 331, Poloxamer 333, Poloxamer 334, Poloxamer 335, Poloxamer 338, Poloxamer 401, Poloxamer 402, Poloxamer 403, Poloxamer 407, Poloxamer 105 Benzoate, and Poloxamer 182 Dibenzoate.

Suitable cationic surfactants include, but are not limited to, a quaternary ammonium compound, an alkyl trimethyl ammonium chloride compound, a dialkyl dimethyl ammonium chloride compound, a cationic halogen-containing compound, such as cetylpyridinium chloride, Benzalkonium chloride, Benzalkonium chloride, Benzyldimethylhexadecylammonium chloride, Benzyldimethyltetradecylammonium chloride, Benzyldodecyldimethylammonium bromide, Benzyltrimethylammonium tetrachloroiodate, Dimethyldioctadecylammonium bromide, Dodecylethyldimethylammonium bromide, Dodecyltrimethylammonium bromide, Dodecyltrimethylammonium bromide, Ethylhexadecyldimethylammonium bromide, Girard's reagent T, Hexadecyltrimethylammonium bromide, Hexadecyltrimethylammonium bromide, N,N',N'-Polyoxyethylene(10)-N-tallow-1,3-diaminopropane, Thonzonium bromide, Trimethyl (tetradecyl)ammonium bromide, 1,3,5-Triazine-1,3,5 (2H, 4H,6H)-triethanol, 1-Decanaminium, N-decyl-N,N-dimethyl-, chloride, Didecyl dimethyl ammonium chloride, 2-(2-(p-(Diisobutyl)cresosxy)ethoxy)ethyl dimethyl benzyl ammonium chloride, 2-(2-(p-(Diisobutyl)phenoxy)ethoxy) ethyl dimethyl benzyl ammonium chloride, Alkyl 1 or 3 benzyl-1-(2-hydroxethyl)-2-imidazolinium chloride, Alkyl bis(2-hydroxyethyl)benzyl ammonium chloride, Alkyl demethyl benzyl ammonium chloride, Alkyl dimethyl 3,4-dichlorobenzyl ammonium chloride (100% $C_{12}$), Alkyl dimethyl 3,4-dichlorobenzyl ammonium chloride (50% $C_{14}$, 40% $C_{12}$, 10% $C_{16}$), Alkyl dimethyl 3,4-dichlorobenzyl ammonium chloride (55% $C_{14}$, 23% $C_{12}$, 20% $C_{16}$), Alkyl dimethyl benzyl ammonium chloride, Alkyl dimethyl benzyl ammonium chloride (100% $C_{14}$), Alkyl dimethyl benzyl ammonium chloride (100% $C_{16}$), Alkyl dimethyl benzyl ammonium chloride (41% $C_{14}$, 28% $C_{12}$), Alkyl dimethyl benzyl ammonium chloride (47% $C_{12}$, 18% $C_{14}$), Alkyl dimethyl benzyl ammonium chloride (55% $C_{16}$, 20% $C_{14}$), Alkyl dimethyl benzyl ammonium chloride (58% $C_{14}$, 28% $C_{16}$), Alkyl dimethyl benzyl ammonium chloride (60% $C_{14}$, 25% $C_{12}$), Alkyl dimethyl benzyl ammonium chloride (61% $C_{11}$, 23% $C_{14}$), Alkyl dimethyl benzyl ammonium chloride (61% $C_{12}$, 23% $C_{14}$), Alkyl dimethyl benzyl ammonium chloride (65% $C_{12}$, 25% $C_{14}$), Alkyl dimethyl benzyl ammonium chloride (67% $C_{12}$, 24% $C_{14}$), Alkyl dimethyl benzyl ammonium chloride (67% $C_{12}$, 25% $C_{14}$), Alkyl dimethyl benzyl ammonium chloride (90% $C_{14}$, 5% $C_{12}$), Alkyl dimethyl benzyl ammonium chloride (93% $C_{14}$, 4% $C_{12}$), Alkyl dimethyl benzyl ammonium chloride (95% $C_{16}$, 5% $C_{18}$), Alkyl dimethyl benzyl ammonium chloride, Alkyl didecyl dimethyl ammonium chloride, Alkyl dimethyl benzyl ammonium chloride, Alkyl dimethyl benzyl ammonium chloride ($C_{12-16}$), Alkyl dimethyl benzyl ammonium chloride ($C_{12-18}$), Alkyl dimethyl benzyl ammonium chloride, dialkyl dimethyl benzyl ammonium chloride, Alkyl dimethyl dimethybenzyl ammonium chloride, Alkyl dimethyl ethyl ammonium bromide (90% $C_{14}$, 5% $C_{16}$, 5% $C_{12}$), Alkyl dimethyl ethyl ammonium bromide (mixed alkyl and alkenyl groups as in the fatty acids of soybean oil), Alkyl dimethyl ethylbenzyl ammonium chloride, Alkyl dimethyl ethylbenzyl ammonium chloride (60% $C_{14}$), Alkyl dimethyl isopropylbenzyl ammonium chloride (50% $C_{12}$, 30% $C_{14}$, 17% $C_{16}$, 3% $C_{18}$), Alkyl trimethyl ammonium chloride (58% $C_{18}$, 40% $C_{16}$, 1% $C_{14}$, 1% $C_{12}$), Alkyl trimethyl ammonium chloride (90% $C_{18}$, 10% $C_{16}$), Alkyldimethyl (ethylbenzyl)ammonium chloride ($C_{12-18}$), Di-($C_{8-10}$)-alkyl dimethyl ammonium chlorides, Dialkyl dimethyl ammonium chloride, Dialkyl methyl benzyl ammonium chloride, Didecyl dimethyl ammonium chloride, Diisodecyl dimethyl ammonium chloride, Dioctyl dimethyl ammonium chloride, Dodecyl bis(2-hydroxyethyl) octyl hydrogen ammonium chloride, Dodecyl dimethyl benzyl ammonium chloride, Dodecylcarbamoyl methyl dinethyl benzyl ammonium chloride, Heptadecyl hydroxyethylimidazolinium chloride, Hexahydro-1,3,5-tris(2-hydroxyethyl)-s-triazine, Hexahydro-1,3,5-tris(2-hydroxyethyl)-s-triazine, Myristalkonium chloride (and) Quat RNIUM 14, N,N-Dimethyl-2-hydroxypropylammonium chloride polymer, n-Tetradecyl dimethyl benzyl ammonium chloride monohydrate, Octyl decyl dimethyl ammonium chloride, Octyl dodecyl dimethyl ammonium chloride, Octyphenoxyethoxyethyl dimethyl benzyl ammonium chloride, Oxydiethylenebis(alkyl dimethyl ammonium chloride), Quaternary ammonium compounds, dicoco alkyldimethyl, chloride, Trimethoxysily propyl dimethyl octadecyl ammonium chloride, Trimethoxysilyl quats, Trimethyl dodecylbenzyl ammonium chloride, semi-synthetic derivatives thereof, and combinations thereof.

Exemplary cationic halogen-containing compounds include, but are not limited to, cetylpyridinium halides, cetyltrimethylammonium halides, cetyldimethylethylammonium halides, cetyldimethylbenzylammonium halides, cetyltributylphosphonium halides, dodecyltrimethylammonium halides, or tetradecyltrimethylammonium halides. In some particular embodiments, suitable cationic halogen containing compounds comprise, but are not limited to, cetylpyridinium chloride (CPC), cetyltrimethylammonium chloride, cetylbenzyldimethylammonium chloride, cetylpyridinium bromide (CPB), cetyltrimethylammonium bromide (CTAB), cetyidimethylethylammonium bromide, cetyltributylphosphonium bromide, dodecyltrimethylammonium bromide, and tetrad ecyltrimethylammonium bromide. In particularly preferred embodiments, the cationic halogen containing compound is CPC, although the compositions of the present invention are not limited to formulation with an particular cationic containing compound.

Suitable anionic surfactants include, but are not limited to, a carboxylate, a sulphate, a sulphonate, a phosphate, chenodeoxycholic acid, chenodeoxycholic acid sodium salt, cholic acid, ox or sheep bile, Dehydrocholic acid, Deoxycholic acid, Deoxycholic acid, Deoxycholic acid methyl ester, Digitonin, Digitoxigenin, N,N-Dimethyldodecylamine N-oxide, Docusate sodium salt, Glycochenodeoxycholic acid sodium salt, Glycocholic acid hydrate, synthetic, Glycocholic acid sodium salt hydrate, synthetic, Glycodeoxycholic acid monohydrate, Glycodeoxycholic acid sodium salt, Glycodeoxycholic acid sodium salt, Glycolithocholic acid 3-sulfate disodium salt, Glycolithocholic acid ethyl ester, N-Lauroylsarcosine sodium salt, N-Lauroylsarcosine solution, N-Lauroylsarcosine solution, Lithium dodecyl sulfate, Lithium dodecyl sulfate, Lithium dodecyl sulfate, Lugol solution, Niaproof 4, Type 4, 1-Octanesulfonic acid sodium salt, Sodium 1-butanesulfonate, Sodium 1-decanesulfonate, Sodium 1-decanesulfonate, Sodium 1-dodecanesulfonate, Sodium 1-heptanesulfonate anhydrous, Sodium 1-heptanesulfonate anhydrous, Sodium 1-nonanesulfonate, Sodium 1-propanesulfonate monohydrate, Sodium 2-bromoethanesulfonate, Sodium cholate hydrate, Sodium choleate, Sodium deoxycholate, Sodium deoxycholate monohydrate, Sodium dodecyl sulfate, Sodium hexanesulfonate anhydrous, Sodium octyl sulfate, Sodium pentanesulfonate anhydrous, Sodium taurocholate, Taurochenodeoxycholic acid sodium salt, Taurodeoxycholic acid sodium salt monohydrate, Taurohyodeoxycholic acid sodium salt hydrate, Taurolithocholic acid 3-sulfate disodium salt, Tauroursodeoxycholic acid sodium salt, Trizma® dodecyl sulfate, Tween® 80, Ursodeoxycholic acid, semi-synthetic derivatives thereof, and combinations thereof.

Suitable zwitterionic surfactants include, but are not limited to, an N-alkyl betaine, lauryl amindo propyl dimethyl betaine, an alkyl dimethyl glycinate, an N-alkyl amino propionate, CHAPS, minimum 98% (TLC), CHAPS, SigmaUltra, minimum 98% (TLC), CHAPS, for electrophoresis, minimum 98% (TLC), CHAPSO, minimum 98%, CHAPSO, SigmaUltra, CHAPSO, for electrophoresis, 3-(Decyldimethylammonio) propanesulfonate inner salt, 3-Dodecyldimethylammonio) propanesulfonate inner salt, SigmaUltra, 3-(Dodecyldimethylammonio) propanesulfonate inner salt, 3-(N,N-Dimethylmyristylammonio) propanesulfonate, 3-(N,N-Dimethyloctadecylammonio) propanesulfonate, 3-(N,N-Dimethyloctylammonio) propanesulfonate inner salt, 3-(N,N-Dimethylpalmitylammonio) propanesulfonate, semi-synthetic derivatives thereof, and combinations thereof.

In some embodiments, the disclosed nanoemulsion formulations comprises a surfactant in a concentration of about 1% to about 15%, about 3% to about 12%, or about 5% to about 10% (w/w). For example, disclosed nanoemulsion formulations may comprise about 1, about 2, about 3, about 4, about 5, about 6, about 7, about 8, about 9, about 10, about 11, about 12, about 13, about 14, or about 15% (w/w) of a suitable surfactant (e.g., a polysorbate or a polyethylene glycol).

v. Additional Components

Additional compounds suitable for use in the disclosed nanoemulsion formulations may include but are not limited to one or more solvents, such as an organic phosphate-based solvent, bulking agents, coloring agents, pharmaceutically acceptable excipients, a preservative, pH adjuster, buffer, chelating agent, etc. The additional compounds can be admixed into a previously emulsified nanoemulsion, or the additional compounds can be added to the original mixture to be emulsified. In certain of these embodiments, one or more additional compounds are admixed into an existing nanoemulsion composition immediately prior to its use.

Suitable preservatives in the disclosed nanoemulsion formulations include, but are not limited to, benzalkonium chloride (BKC), methyl paraben, benzyl alcohol, cetylpyridinium chloride, chlorhexidine, imidazolidinyl urea, phenol, potassium sorbate, benzoic acid, bronopol, chlorocresol, paraben esters, phenoxyethanol, sorbic acid, alpha-tocopherol, ascorbic acid, ascorbyl palmitate, butylated hydroxyanisole, butylated hydroxytoluene, sodium ascorbate, sodium metabisulphite, citric acid, edetic acid, semi-synthetic derivatives thereof, and combinations thereof. Other suitable preservatives include, but are not limited to, benzyl alcohol, chlorhexidine (bis(p-chlorophenyldiguanido) hexane), chlorphenesin (3-(-4-chlorpheoxy)-propane-1,2-diol), Kathon CG (methyl and methylchloroisothiazolinone), parabens (methyl, ethyl, propyl, butyl hydrobenzoates), phenoxyethanol (2-phenoxyethanol), sorbic acid (potassium sorbate, sorbic acid), Phenonip (phenoxyethanol, methyl, ethyl, butyl, propyl parabens), Phenoroc (phenoxyethanol 0.73%, methyl paraben 0.2%, propyl paraben 0.07%), Liquipar Oil (isopropyl, isobutyl, butylparabens), Liquipar PE (70% phenoxyethanol, 30% liquipar oil), Nipaguard MPA (benzyl alcohol (70%), methyl & propyl parabens), Nipaguard MPS (propylene glycol, methyl & propyl parabens), Nipasept (methyl, ethyl and propyl parabens), Nipastat (methyl, butyl, ethyl and propyel parabens), Elestab 388 (phenoxyethanol in propylene glycol plus chlorphenesin and methylparaben), and Killitol (7.5% chlorphenesin and 7.5% methyl parabens). In some embodiments, the nanoemulsion formulations may include more than one of the disclosed preservatives.

The disclosed nanoemulsion formulations may further comprise at least one pH adjuster. Suitable pH adjusters in the nanoemulsion vaccine of the invention include, but are not limited to, diethyanolamine, lactic acid, monoethanolamine, triethylanolamine, sodium hydroxide, sodium phosphate, semi-synthetic derivatives thereof, and combinations thereof.

In addition, the disclosed nanoemulsion formulations can comprise a chelating agent. In one embodiment of the invention, the chelating agent is present in an amount of about 0.0005% to about 1%. Examples of chelating agents include, but are not limited to, ethylenediamine, ethylenediaminetetraacetic acid (EDTA), phytic acid, polyphosphoric acid, citric acid, gluconic acid, acetic acid, lactic acid, and dimercaprol, and a preferred chelating agent is ethylenediaminetetraacetic acid.

The disclosed nanoemulsion formulations can comprise a buffering agent, such as a pharmaceutically acceptable buffering agent. Examples of buffering agents include, but are not limited to, 2-Amino-2-methyl-1,3-propanediol, ≥99.5% (NT), 2-Amino-2-methyl-1-propanol, ≥99.0% (GC), L-(+)-Tartaric acid, ≥99.5% (T), ACES, ≥99.5% (T), ADA, ≥99.0% (T), Acetic acid, ≥99.5% (GC/T), Acetic acid, for luminescence, ≥99.5% (GC/T), Ammonium acetate solution, for molecular biology, ~5 M in $H_2O$, Ammonium acetate, for luminescence, ≥99.0% (calc. on dry substance, T), Ammonium bicarbonate, ≥99.5% (T), Ammonium citrate dibasic, ≥99.0% (T), Ammonium formate solution, 10 M in H2O, Ammonium formate, ≥99.0% (calc. based on dry substance, NT), Ammonium oxalate monohydrate, ≥99.5% (RT), Ammonium phosphate dibasic solution, 2.5 M in H2O, Ammonium phosphate dibasic, ≥99.0% (T), Ammonium phosphate monobasic solution, 2.5 M in H2O, Ammonium phosphate monobasic, ≥99.5% (T), Ammonium sodium phosphate dibasic tetrahydrate, ≥99.5% (NT), Ammonium sulfate solution, for molecular biology, 3.2 M in $H_2O$, Ammonium tartrate dibasic solution, 2 M in H2O (colorless solution at 20° C.), Ammonium tartrate dibasic, ≥99.5% (T), BES buffered saline, for molecular biology, 2× concentrate, BES, ≥99.5% (T), BES, for molecular biology, ≥99.5% (T), BICINE buffer Solution, for molecular biology, 1 M in H2O, BICINE, ≥99.5% (T), BIS-TRIS, ≥99.0% (NT), Bicarbonate buffer solution, >0.1 M Na2CO3, >0.2 M $NaHCO_3$, Boric acid, ≥99.5% (T), Boric acid, for molecular biology, ≥99.5% (T), CAPS, ≥99.0% (TLC), CHES, ≥99.5% (T), Calcium acetate hydrate, ≥99.0% (calc. on dried material, KT), Calcium carbonate, precipitated, ≥99.0% (KT), Calcium citrate tribasic tetrahydrate, ≥98.0% (calc. on dry substance, KT), Citrate Concentrated Solution, for molecular biology, 1 M in H2O, Citric acid, anhydrous, ≥99.5% (T), Citric acid, for luminescence, anhydrous, ≥99.5% (T), Diethanolamine, ≥99.5% (GC), EPPS, ≥99.0% (T), Ethylenediaminetetraacetic acid disodium salt dihydrate, for molecular biology, ≥99.0% (T), Formic acid solution, 1.0 M in $H_2O$, Gly-Gly-Gly, ≥99.0% (NT), Gly-Gly, ≥99.5% (NT), Glycine, ≥99.0% (NT), Glycine, for luminescence, ≥99.0% (NT), Glycine, for molecular biology, ≥99.0% (NT), HEPES buffered saline, for molecular biology, 2× concentrate, HEPES, ≥99.5% (T), HEPES, for molecular biology, ≥99.5% (T), Imidazole buffer Solution, 1 M in $H_2O$, Imidazole, ≥99.5% (GC), Imidazole, for luminescence, ≥99.5% (GC), Imidazole, for molecular biology, ≥99.5% (GC), Lipoprotein Refolding Buffer, Lithium acetate dihydrate, ≥99.0% (NT), Lithium citrate tribasic tetrahydrate, ≥99.5% (NT), MES hydrate, ≥99.5% (T), MES monohydrate, for luminescence, ≥99.5% (T), MES solution, for molecular biology, 0.5 M in $H_2O$, MOPS, ≥99.5% (T), MOPS, for luminescence, ≥99.5% (T), MOPS, for molecular biology, ≥99.5% (T), Magnesium acetate solution, for molecular biology, ~1 M in $H_2O$, Magnesium acetate tetrahydrate, ≥99.0% (KT), Magnesium citrate tribasic nonahydrate, ≥98.0% (calc. based on dry substance, KT), Magnesium formate solution, 0.5 M in $H_2O$, Magnesium phosphate dibasic trihydrate, ≥98.0% (KT), Neutralization solution for the in-situ hybridization for in-situ hybridization, for molecular biology, Oxalic acid dihydrate, ≥99.5% (RT), PIPES, ≥99.5% (T), PIPES, for molecular biology, ≥99.5% (T), Phosphate buffered saline, solution (autoclaved), Phosphate buffered saline, washing buffer for peroxidase conjugates in Western Blotting, 10× concentrate, Piperazine, anhydrous, ≥99.0% (T), Potassium D-tartrate monobasic, ≥99.0% (T), Potassium acetate solution, for molecular biology, Potassium acetate solution, for molecular biology, 5 M in $H_2O$, Potassium acetate solution, for molecular biology, ~1 M in $H_2O$, Potassium acetate, ≥99.0% (NT), Potassium acetate, for luminescence, ≥99.0% (NT), Potassium acetate, for molecular biology, ≥99.0% (NT), Potassium bicarbonate, ≥99.5% (T), Potassium carbonate, anhydrous, ≥99.0% (T), Potassium chloride, ≥99.5% (AT), Potassium citrate monobasic, ≥99.0% (dried material, NT), Potassium citrate tribasic solution, 1 M in $H_2O$, Potassium formate solution, 14 M in $H_2O$, Potassium formate, ≥99.5% (NT), Potassium oxalate monohydrate, ≥99.0% (RT), Potassium phosphate dibasic, anhydrous, ≥99.0% (T), Potassium phosphate dibasic, for luminescence, anhydrous, ≥99.0% (T), Potassium phosphate dibasic, for molecular biology, anhydrous, ≥99.0% (T), Potassium phosphate monobasic, anhydrous, ≥99.5% (T), Potassium phosphate monobasic, for molecular biology, anhydrous, ≥99.5% (T), Potassium phosphate tribasic monohydrate, ≥95% (T), Potassium phthalate monobasic, ≥99.5% (T), Potassium sodium tartrate solution, 1.5 M in $H_2O$, Potassium sodium tartrate tetrahydrate, ≥99.5% (NT), Potassium tetraborate tetrahydrate, ≥99.0% (T), Potassium tetraoxalate dihydrate, ≥99.5% (RT), Propionic acid solution, 1.0 M in $H_2O$, STE buffer solution, for molecular biology, pH 7.8, STET buffer solution, for molecular biology, pH 8.0, Sodium 5,5-diethylbarbiturate, ≥99.5% (NT), Sodium acetate solution, for molecular biology, ~3 M in $H_2O$, Sodium acetate trihydrate, ≥99.5% (NT), Sodium acetate, anhydrous, ≥99.0% (NT), Sodium acetate, for luminescence, anhydrous, ≥99.0% (NT), Sodium acetate, for molecular biology, anhydrous, ≥99.0% (NT), Sodium bicarbonate, ≥99.5% (T), Sodium bitartrate monohydrate, ≥99.0% (T), Sodium carbonate decahydrate, ≥99.5% (T), Sodium carbonate, anhydrous, ≥99.5% (calc. on dry substance, T), Sodium citrate monobasic, anhydrous, ≥99.5% (T), Sodium citrate tribasic dihydrate, ≥99.0% (NT), Sodium citrate tribasic dihydrate, for luminescence, ≥99.0% (NT), Sodium citrate tribasic dihydrate, for molecular biology, ≥99.5% (NT), Sodium formate solution, 8 M in H₂O, Sodium oxalate, ≥99.5% (RT), Sodium phosphate dibasic dihydrate, ≥99.0% (T), Sodium phosphate dibasic dihydrate, for luminescence, ≥99.0% (T), Sodium phosphate dibasic dihydrate, for molecular biology, ≥99.0% (T), Sodium phosphate dibasic dodecahydrate, ≥99.0% (T), Sodium phosphate dibasic solution, 0.5 M in H₂O, Sodium phosphate dibasic, anhydrous, ≥99.5% (T), Sodium phosphate dibasic, for molecular biology, ≥99.5% (T), Sodium phosphate monobasic dihydrate, ≥99.0% (T), Sodium phosphate monobasic dihydrate, for molecular biology, ≥99.0% (T), Sodium phosphate monobasic monohydrate, for molecular biology, ≥99.5% (T), Sodium phosphate monobasic solution, 5 M in H₂O, Sodium pyrophosphate dibasic, ≥99.0% (T), Sodium pyrophosphate tetrabasic decahydrate, ≥99.5% (T), Sodium tartrate dibasic dihydrate, ≥99.0% (NT), Sodium tartrate dibasic solution, 1.5 M in H₂O (colorless solution at 20° C.), Sodium tetraborate decahydrate, ≥99.5% (T), TAPS, ≥99.5% (T), TES, ≥99.5% (calc. based on dry substance, T), TM buffer solution, for molecular biology, pH 7.4, TNT buffer solution, for molecular biology, pH 8.0, TRIS Glycine buffer solution, 10× concentrate, TRIS acetate-EDTA buffer solution, for molecular biology, TRIS buffered saline, 10× concentrate, TRIS glycine SDS buffer solution, for electrophoresis, 10× concentrate, TRIS phosphate-EDTA buffer solution, for molecular biology, concentrate, 10× concentrate, Tricine, ≥99.5% (NT), Triethanolamine, ≥99.5% (GC), Triethylamine, ≥99.5% (GC), Triethylammonium acetate buffer, volatile buffer, ~1.0 M in H₂O, Triethylammonium phosphate solution, volatile buffer, ~1.0 M in H₂O, Trimethylammonium acetate solution, volatile buffer, ~1.0 M in H₂O, Trimethylammonium phosphate solution, volatile buffer, ~1 M in H₂O, Tris-EDTA buffer solution, for molecular biology, concentrate, 100× concentrate, Tris-EDTA buffer solution, for molecular biology, pH 7.4, Tris-EDTA buffer solution, for molecular biology, pH 8.0, Trizma® acetate, ≥99.0% (NT), Trizma® base, ≥99.8% (T), Trizma® base, ≥99.8% (T), Trizma® base, for luminescence, ≥99.8% (T), Trizma® base, for molecular biology, ≥99.8% (T), Trizma® carbonate, ≥98.5% (T), Trizma® hydrochloride buffer solution, for molecular biology, pH 7.2, Trizma® hydrochloride buffer solution, for molecular biology, pH 7.4, Trizma® hydrochloride buffer solution, for molecular biology, pH 7.6, Trizma® hydrochloride buffer solution, for molecular biology, pH 8.0, Trizma® hydrochloride, ≥99.0% (AT), Trizma® hydrochloride, for luminescence, ≥99.0% (AT), Trizma® hydrochloride, for molecular biology, ≥99.0% (AT), and Trizma® maleate, ≥99.5% (NT).

The disclosed nanoemulsion formulations can comprise one or more emulsifying agents to aid in the formation of emulsions. Emulsifying agents include compounds that aggregate at the oil/water interface to form a kind of continuous membrane that prevents direct contact between two adjacent droplets.

D. Globule and Particle Size

The disclosed nanoemulsion formulations may comprise droplets (i.e., globule of the oil phase) having an average diameter size of less than about 1,000 nm (i.e., 1 micron). In other embodiments of the invention, the droplet size has an average diameter of less than about 950 nm, less than about 900 nm, less than about 850 nm, less than about 800 nm, less than about 750 nm, less than about 700 nm, less than about 650 nm, less than about 600 nm, less than about 550 nm, less than about 500 nm, less than about 450 nm, less than about 400 nm, less than about 350 nm, less than about 300 nm, less than about 250 nm, less than about 200 nm, less than about 150 nm, or any combination thereof. In one embodiment, the droplets have an average diameter size greater than about 125 nm and less than or equal to about 600 nm. In a different embodiment, the droplets have an average diameter size greater than about 50 nm or greater than about 70 nm, and less than or equal to about 125 nm, less than or equal to about 130 nm, less than or equal to about 135 nm, less than or equal to about 140 nm, or less than or equal to about 145.

The disclosed nanoemulsion formulations may comprise particle of an active compound (e.g., THC, CBD, or CBDi, cyclosporine, etc.) having an average diameter size of less than about 1,000 nm (i.e., 1 micron). In other embodiments of the invention, the active agent particle size has an average diameter of less than about 950 nm, less than about 900 nm, less than about 850 nm, less than about 800 nm, less than about 750 nm, less than about 700 nm, less than about 650 nm, less than about 600 nm, less than about 550 nm, less than about 500 nm, less than about 450 nm, less than about 400 nm, less than about 350 nm, less than about 300 nm, less than about 250 nm, less than about 200 nm, less than about 150 nm, or any combination thereof. In one embodiment, the droplets have an average diameter size greater than about 125 nm and less than or equal to about 600 nm. In a different embodiment, the active agent particles have an average diameter size greater than about 50 nm or greater than about 70 nm, and less than or equal to about 125 nm, less than or equal to about 130 nm, less than or equal to about 135 nm, less than or equal to about 140 nm, or less than or equal to about 145.

III. Pharmaceutical Compositions

The disclosed nanoemulsion formulations may be formulated into pharmaceutical compositions that comprise the nanoemulsion in a therapeutically effective amount and suitable, pharmaceutically-acceptable excipients for pharmaceutically acceptable delivery. Such excipients are well known in the art.

Exemplary dosage forms for pharmaceutical administration include, but are not limited to, drops, liquids, ointments, creams, emulsions, lotions, gels, bioadhesive gels, sprays, aerosols, pastes, foams, and suspensions. The disclosed formulations are generally intended for topical applications, which includes ophthalmic administration directly into or onto the eye.

The disclosed nanoemulsion formulations may be formulated for immediate release, sustained release, controlled release, delayed release, or any combinations thereof, into the epidermis or dermis. In some embodiments, the formulations may comprise a penetration-enhancing agent. Suitable penetration-enhancing agents include, but are not limited to, alcohols such as ethanol, triglycerides and aloe compositions.

The disclosed nanoemulsion formulations and pharmaceutical dosage forms thereof may be applied in a single administration or in multiple administrations. For instance, 1, 2, 3, 4, 5, 6, 7, 8, 9, or 10 or more times per day, every other day, every three days, every four days, every five days, every six days, or every week.

In some embodiments, the disclosed nanoemulsion formulations may be administered at total dosage amounts of about 10 mg to about 50000 mg of the at least one cannabinoid or a salt or derivative thereof. In some embodiments, the disclosed nanoemulsion formulations may be administered at total dosage amounts of about 50 mg to about 5000 mg of cyclosporine or a salt or derivative thereof.

The dosage of the pharmaceutical composition can vary depending on a given patient's weight, age, gender, administration time and mode, and the severity of disease.

IV. Methods of Treating Ophthalmic Conditions

The present disclosure provides uses and methods for treating ophthalmic conditions, such as but not limited to dry eye, with nanoemulsions comprising at least one cannabinoid or a salt or derivative thereof (e.g., THC and/or CBD or CBDi) and, optionally, cyclosporine or a salt or derivative thereof.

In general, treatment of ophthalmic conditions such as dry eye will comprise topically administering one of the disclosed nanoemulsion formulations directly into or onto the eye of a subject suffering from dry eye. Thus, the nanoemulsion formulations may commonly be prepared as an eye drop, gel, hydrogel, cream, suspension, or other liquid formulation. When the nanoemulsion formulations are prepared in such a way, an exemplary dose may include about 1, about 2, about 3, about 4, about 5 or more drops of the eye drop, gel, hydrogel, cream, suspension, or other liquid formulation. Doses may be necessary at various frequencies as well. For instance, in some embodiments, a subject may be administered a one dose per day, two doses per day (e.g., spaced approximately 12 hours apart), three doses per day, four doses per day, five doses per day, or simply as needed. In some embodiments, daily dosing may not be required, and a subject may be administered one or more doses every other day, every three days, every four days, every five days, every six day, or every week.

Without being bound by theory, it is believed that the disclosed nanoemulsion formulation comprising at least one cannabinoid or a salt or derivative thereof treat uncomfortable ophthalmic conditions through a combination of analgesic and anti-inflammatory effects. The cannabinoids or a salt or derivative thereof may also decrease ocular pressure. In embodiments further comprising a second active compound, such as cyclosporine or a salt or derivative thereof, additional synergistic benefit is expected because the cannabinoids and cyclosporine function via different mechanisms and effect different pathways. As a result, the combination of at least one cannabinoid or a salt or derivative thereof and cyclosporine or a salt or derivative thereof will be more efficacious than administration of cyclosporine alone, produce fewer side effects (e.g., pain and corneal irritation), and result in a more rapid onset of the intended therapeutic effect of eliminating, reducing, or ameliorating at least one or more signs or symptoms of dry eye. Indeed, treating dry eye with the novel combination of cyclosporine or a salt or derivative thereof and at least one cannabinoid or a salt or derivative thereof is expected to provide numerous clinical benefits, as discussed herein, regardless of the precise formulation used.

A person of ordinary skill in the art would understand that the degree of corneal irritation that a given ophthalmic treatment produces can be determined via, for example, acute eye irritation/corrosion tests in animals. These tests may include, for example, pretreatment with an appropriate anesthetic followed by application of the experimental treatment (i.e., one of the disclosed nanoemulsion formulations or a cyclosporine formulation without a cannabinoid) to the eye of an experimental animal, such as a rabbit, rat, or mouse. Untreated animals may serve as a control. The degree of eye irritation or corneal irritation may be evaluated by scoring lesions of the conjunctiva, cornea, and/or iris at specific time intervals. The duration of the study may be long enough to determine whether any adverse effects are reversible.

Similarly, a person of ordinary skill in the art would understand that the onset of therapeutic effect can be determined through, for example, determining the increase in aqueous tear production and other efficacy tests as required by the U.S. FDA. Other suitable endpoints may include, but are not limited to, a decrease in pain, irritation, redness, or dryness of an individual's eye following treatment with a given therapeutic (i.e., one of the disclosed nanoemulsion formulations or a cyclosporine formulation without a cannabinoid). In some embodiments, treatment with the disclosed nanoemulsion formulations or, in particular, with the combination of cyclosporine or a salt or derivative thereof and at least one cannabinoid or a salt or derivative thereof may result in the onset of therapeutic activity within less than about 3 months, less than about 2 months, less than about 1 month, less than about 3 weeks, less than about 2 weeks, or less than about 1 week.

Methods of treatments utilizing the claimed formulations can be used for non-ophthalmic conditions as well.

Definitions

As used in the description of the invention, the singular forms "a", "an" and "the" are used interchangeably and intended to include the plural forms as well and fall within each meaning, unless the context clearly indicates otherwise. Also, as used herein, "and/or" refers to and encompasses any and all possible combinations of one or more of the listed items, as well as the lack of combinations when interpreted in the alternative ("or").

As used herein, the term "about" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

As used herein, the phrases "therapeutically effective amount" and "therapeutic level" mean that drug dosage that provides the specific pharmacological effect for which the drug is administered in a subject that is in need of treatment for dry eye, i.e., to reduce, ameliorate, or eliminate the symptoms or effects of dry eye. It is emphasized that a therapeutically effective amount or therapeutic level of a drug will not always be effective in treating the conditions described herein, even though such dosage is deemed to be a therapeutically effective amount by those of skill in the art. For convenience only, exemplary dosages, drug delivery amounts, therapeutically effective amounts, and therapeutic levels are provided herein. The therapeutically effective amount may vary based on the route of administration and dosage form, the age and/or weight of the subject, and/or the subject's condition, including the severity of the condition being treated.

The terms "treatment" or "treating" as used herein with reference to dry eye or ophthalmic conditions mean reducing, ameliorating or eliminating one or more symptoms or effects of dry eye, which may include, but are not limited to, irritation, redness, discharge, eye fatigue, and blurred vision.

The terms "individual," "subject," and "patient" are used interchangeably herein, and refer to any individual mammal subject, e.g., bovine, canine, feline, equine, or human. In preferred embodiments, the subject is a human.

The terms "administration of" or "administering" an active agent or nanoemulsion of the present disclosure should be understood to mean providing the agent or nanoemulsion to a subject in need of treatment by a means that can be introduced into that individual's body in a therapeutically useful form and therapeutically effective amount. For example, the disclosed nanoemulsions may be administered opthalmically, i.e., directly into or on the eye of the subject.

The term "nanoemulsion" as used herein, includes small oil-in-water dispersions or droplets, as well as other lipid structures which can form as a result of hydrophobic forces which drive apolar residues (e.g., long hydrocarbon chains) away from water and drive polar head groups toward water, when a water immiscible oily phase is mixed with an aqueous phase. These other lipid structures include, but are not limited to, unilamellar, paucilamellar, and multilamellar lipid vesicles, micelles, and lamellar phases. The present disclosure contemplates that one skilled in the art will appreciate this distinction when necessary for understanding the specific embodiments herein disclosed. Nanoemulsion particle size may vary, but lipid droplets in the emulsion will tend to be less than about 1 micron, or more specifically, less than about 500, about 400, about 300, about 200, about 175, about 150, or about 125 nm in diameter (or other particles sizes described herein).

The term "multiphasic" as used in the context of the present disclosure means that an active agent (e.g., THC, CBD, CBDi and/or cyclosporine) can be found in multiple phases of a given nanoemulsion. For example, a given nanoformulation may be "triphasic," meaning the active agent is dissolved in the aqueous phase and oil phase of the nanoemulsion, as well as being in a particulate form in suspension within the nanoemulsion. The unique multiphasic nature of the disclosed nanoemulsion formulations may be attributed to the high pressure (i.e., >10,000 psi) homogenization process used to produce the nanoemulsions.

As used herein, the term "isolated" refers to cannabinoids or salts or derivatives thereof that are independent from their natural location. In other words, isolated cannabinoids may be directly obtained from a cannabis plant or synthesized.

The disclosed nanoemulsion formulations and methods of using the same are further described below by reference to the examples, which are provided for illustration only. The invention is not limited to the examples, but rather includes all variations that are evident from the teachings provided herein. All publicly available documents referenced herein, including but not limited to U.S. patents, are specifically incorporated by reference.

EXAMPLES

Example 1—Treatment of Dry Eye in a Human Subject

This example describes the use of the disclosed cyclosporine and cannabinoid-comprising nanoemulsions in the treatment of an ophthalmic condition such as dry eye in a subject. In this example, at least one cannabinoid (e.g., THC and/or CBD or CBDi) is formulated in the disclosed nanoemulsion with cyclosporine for the purposes of preparing a pharmaceutical product.

Subjects suspected of having or diagnosed with dry eye receive at least one administration of a therapeutically effective amount of a disclosed nanoemulsion, either alone or in combination with one or more additional agents for the treatment or prevention of dry eye. The disclosed nanoemulsion (and optional additional agents) are administered directly to the eye according to methods known in the art. Subjects will be evaluated regularly for the presence and/or severity of signs and symptoms associated with dry eye, including, but not limited to, e.g., dry, irritated or red eyes, irritation, and/or pain. Treatments may be maintained until such a time as one or more signs or symptoms of dry eye are prevented.

It is predicted that subjects receiving a therapeutically effective amount of a disclosed cannabinoid-containing cyclosporine nanoemulsion, will have a reduced or abolished signs or symptoms of dry eye, and that these subjects will experience a more rapid clinical improvement than subjects receiving a comparable dose of cyclosporine without a cannabinoid. It is further expected that administration of the disclosed nanoemulsions in combination with one or more additional agents will have additive or synergistic effects in this regard.

These results will show that disclosed nanoemulsions are useful in the prevention and treatment of ophthalmic conditions such as dry eye.

As the following will show, only certain formulations using exemplary oils made by one manufacturer worked and had long-term stability, while formulations by another manufacturer failed.

For stability studies for the formulations described in the specification, samples were kept in (1) accelerated chamber conditions, the accelerated chamber conditions being at 40 degrees Centigrade and 75% relative humidity (ACC). As per FDA guidelines, one month ACC stability is equivalent to roughly four months stability at room temperature, (2) room temperature (RT) of 25 degrees Centigrade (3) as well as refrigeration (REF). Samples that failed ACC conditions were studied at room temperature as well as refrigeration conditions. As of the time of the filing of the specification, samples that failed ACC conditions are still being observed at room temperature and refrigeration. For many of the examples provided below, samples analyses are in progress. All of the samples were packed in amber glass bottles or amber plastic bottles for stability studies.

The following relates to examples of (1) various metal content certificates of analysis of various oils from Oil Brand A Oil and Oil Brand B oil; (2) THC and THC-CBDi Oil Formulations; (3) high concentration CBDi oil formulations; (4) comparison studies between Brand A oil and other oils in CYC-CBDi formulations; (5) comparison studies between one Brand A's oils and other oils of another manufacturer B in CYC-CBDi-THC formulations; and (6) comparison studies between different nanoformulations using Oil Brand A oils.

I. Oil Metal Content Certificate Analyses

The following relates to metal content certificate analyses of various fatty oils from Oil Brand A and Oil Brand B. As later studies show, all oils from one manufacturer Oil Brand A that had metal content relating to chromium, copper, lithium and molybdenum less than 1 PPM were providing better stability when compared with the same fatty oil using oils of another manufacturer Oil Brand B which contained more than 1 PPM of metal content especially one or more of copper, chromium, lithium, and molybdenum. All the oils of one manufacturer B had sesame oil had concentrations of chromium exceeding 1 part per million, copper concentration exceeding 1 part per million, lithium concentrations exceeding 1 ppm per million and molybdenum concentrations exceeding 1 part per million. By contrast, all the oils of one manufacturer A had had concentrations of chromium below 1 ppm, copper concentration below 1 ppm, lithium concentrations below 1 ppm and molybdenum concentrations below 1 ppm. Without being bound by theory, it is believed that a critical factor in imparting pharmaceutical stability is that the pharmaceutical acceptable oil has one or more of the following: a chromium content of less than one part per million in said oil; a copper content of less than one part per million in said oil; a lithium content of less than one part per million in said oil; and a molybdenum content of less than one part per million in said oil.

| Elemental Content in Oil | | | | | |
|---|---|---|---|---|---|
| Oil Type | OIL BRAND A SESAME OIL | OIL BRAND A- Other Oil | OIL BRAND A SAFFLOWER OIL | OIL BRAND A OLIVE OIL | OIL BRAND B SESAME OIL |
| | Results (PPM) of Respective Element | | | | |
| Lead (Pb) | <1 | 1 | <1 | <1 | 0.05 |
| Arsenic (As) | <1 | 1 | <1 | <1 | 0.15 |
| Mercury (Hg) | <1 | 1 | <1 | <1 | 0.03 |
| Chromium (Cr) | <1 | *NA | <1 | <1 | 11 |
| Cadmium (Cd) | <1 | 1 | <1 | <1 | 0.02 |
| Antimony (Sb) | <1 | *NA | <1 | <1 | 0.90 |
| Silver (Ag) | <1 | *NA | <1 | <1 | *NA |
| Cobalt (Co) | <1 | *NA | <1 | <1 | 0.05 |
| Copper (Cu) | <1 | *NA | <1 | <1 | 3 |
| Nickel (Ni) | <1 | *NA | <1 | <1 | 0.20 |
| Vanadium (V) | *NA | *NA | *NA | *NA | 0.10 |
| Lithium (Li) | *NA | *NA | *NA | *NA | 2.50 |
| Molybdenum (Mo) | *NA | *NA | *NA | *NA | 15 |

II. THC and THC-CBDi Oil Compatibility Studies

The following relates to oil excipient compatibility studies using different fatty oils of two different manufacturers. This relates to oil-only formulations. In addition, the following relates to stability of THC-alone and THC-CBDi in Oil Brand A oils versus stability in Oil Brand B oils. At the time of the experiments, the following shows that only formulations using Oil Brand A oil were able to maintain stability past two months in ACC conditions. This is in contrast to Oil Brand B oil, which have concentrations respectively of copper, chromium, lithium and molybdenum exceeding 1 ppm. Without being bound by theory, it is believed that a critical factor in imparting pharmaceutical stability is that the pharmaceutical acceptable oil has one or more of the following: a chromium content of less than one part per million in said oil; a copper content of less than one part per million in said oil; a lithium content of less than one part per million in said oil; and a molybdenum content of less than one part per million in said oil.

The following shows results of oil-only formulations utilizing exemplary Oil Brand A oils having superior stability, in contrast with oils from Oil Brand B.

| Batch No. | Cannabinoid type and Oil type | Stability in ACC |
|---|---|---|
| 1 | 0.5% THC + REFINED OIL BRAND A OLIVE OIL | THC: 4.5 months |
| 2 | 0.5% THC + REFINED OIL BRAND B OLIVE OIL | THC: 1 month |
| 3 | 0.5% THC + OIL BRAND A MCT | THC: 5 months |
| 4 | 0.5% THC + REFINED OIL BRAND B MCT | THC Failed 1st Month |
| 5 | 0.5% THC + REFINED OIL BRAND B SOYBEAN OIL | THC: Failed first month |
| 6 | 0.5% THC + SUPER REFINED OIL BRAND A SOYBEAN OIL | THC: 1 month |
| 7 | 0.5% THC + 1% CBDi + REFINED OIL BRAND A OLIVE OIL | THC: 4 months<br>CBDi: 7 MONTHS |
| 8 | 0.5% THC + 1% CBDi + REFINED OIL BRAND B OLIVE OIL | THC: 1 month<br>CBDi: 1 month |
| 9 | OIL BRAND A MCT + 0.5% THC + 1% CBDi | THC: 5 months<br>CBDi: 7 MONTHS |
| 10 | 0.5% THC + 1% CBDi + REFINED OIL BRAND B MCT | THC: 2 months<br>CBDi: 1 MONTH |

Abbreviations:
ACC stands for Accelerated chamber conditions
THC stands for Delta-9-tetrahydrocannabinol
CBDi stands for Cannabidiol isolate
MCT stands for Medium chain triglycerides From the above excipient study, it can be analyzed that THC and CBDi are more stable in Oil Brand A oils when compared to other brand oils.

Surprisingly and unexpectedly, the foregoing results indicate that mere small differences in concentrations of chromium, copper and molybdenum have significant effects on stability under ACC conditions. The specification already noted that Oil Brand A branded oils and Oil Brand B-branded oils have different concentrations in the foregoing metals. To compare with conventionally known cannabinoid medications, Marinol®, as discussed in the background of the specification, has to be refrigerated for up to 90 days. By contrast, the foregoing studies of THC and CBDi to date show stability of four months and more in ACC conditions. The data indicate that stability conditions in room temperature will be far greater.

The following describes examples of preparing oil-only formulations from the foregoing table.

Exemplary preparation of an oil-only formulation for Batch No. 3 shown in the forgoing table is described as follows. For Batch No. 3 relating to 0.5% THC+ OIL BRAND A MCT, the following steps were performed.

In a beaker, 0.5% (0.05 g) of THC, and 99.5% (9.95 g) of Oil Brand A MCT oil were added and sonication was performed till there was complete dissolution and a single layer was obtained.

For Batch No. 7 relating to 0.5% THC+1% CBDi+ REFINED OIL BRAND A OLIVE OIL, the following steps were performed.

In a beaker, 0.5% (0.05 g) of THC, 1% (0.1 g) of CBDi, and 99% (9.9 g) of refined Oil Brand A Olive oil were added and sonication was performed till there was complete dissolution and a single layer was obtained.

III. High Concentrated CBD Isolate (CBDi) Formulations with Stability

The following shows results of oil-only formulations utilizing exemplary Oil Brand A oils having superior stability.

| FORMULATIONS | OIL | CBDi as % OIL (WEIGHT/WEIGHT) | STABILITY DATA |
|---|---|---|---|
| Example 1-1% PG + OIL BRAND A (700 MG CBDi) (7E) | OIL BRAND A 1% PROPYL GALLATE | 45% | 14 months ACC |
| Example 2-600 MG CBDi + 1% ALPHA TOCO + OIL BRAND A | OIL BRAND A 1% ALPHA-TOCOPHEROL | 40.86% | 11 months ACC |
| Example 3-600 MG CBDi + 1% ALPHA TOCO + OIL BRAND A | OIL BRAND A 1% ALPHA-TOCOPHEROL | 40.86% | 11 months ACC |
| Example 4-600 MG CBDi + 1% ALPHA TOCO OIL BRAND A | OIL BRAND A 1% ALPHA-TOCOPHEROL | 40.86% | 11 months ACC |

As seen from the foregoing data, surprising and unexpectedly, formulations of CBDi in Oil Brand A oils have stability of over 11 months in ACC conditions. To compare with conventionally known cannabinoid medications, Marinol®, as discussed in the background of the specification, has to be refrigerated for up to 90 days. By contrast, the foregoing studies of CBDi to date show stability of eleven months and more in ACC conditions. The data indicate that stability conditions in room temperature will be far greater.

Exemplary preparation of an oil-only formulation for Example 1 shown in the foregoing table is described as follows. For Example 1 relating to 700 MG CBDi+1% PG+ OIL BRAND A, the following steps were performed.

In a beaker, 41.176% (700 mg) of CBDi, 1% Propyl gallate (17 mg), and 57.82% (983 mg) of refined OIL BRAND A oil were added and sonication was performed till there was complete dissolution and a single layer was obtained.

IV. Comparison Studies Between Oil Brand a Oils and Other Oils in CYC-CBDi Nanoformulations The following relates to various stability studies in nanoformulations using Oil Brand A oils and other oils.

| | Formulation Content and Stability Studies Percentage Content of Ingredients (weight/weight) in the following batches | | | | | |
|---|---|---|---|---|---|---|
| Ingredients | Example 1- CYC-CBDi (0.05-1) | Example 2- CYC-CBDi (0.05-1) | Example 3- CYC-CBDi (0.05-0.5%) WT Regular OLIVE | Example 4- CYC-CBDi (0.05-1%) WT Oil Brand A OLIVE + BCD | Example 5- CYC-CBDi (0.05-1) | Example 6- CYC-CBDi (0.05-1%) |
| CYC | 0.05 | 0.05 | 0.05 | 0.05 | 0.05 | 0.05 |
| CBDi | 1 | 1 | 1 | 1 | 0.1 | 1 |
| ETHANOL | 0.2 | 0.2 | 0.2 | 0.2 | 0.2 | 0.2 |

| | | | | | | |
|---|---|---|---|---|---|---|
| OIL BRAND C SESAME | 2 | *NA | 2 | 2 | *NA | 2 |
| OIL BRAND B SESAME | *NA | *NA | *NA | *NA | 2 | *NA |
| OIL BRAND B OLIVE | *NA | *NA | *NA | *NA | 20.74 | *NA |
| OIL BRAND A OLIVE OIL | 8.74 | 18.75 | *NA | 20.74 | *NA | 20.74 |
| OIL BRAND D OLIVE OIL | *NA | *NA | 20.74 | *NA | *NA | *NA |
| POLY80 | 3 | 5 | 6 | 6 | 6 | 6 |
| Deionized water | 85 | 75 | *NA | *NA | *NA | *NA |
| PBS | *NA | *NA | 70 | 70 | 70 | 70 |
| BCD | 0.01 | *NA | 0.01 | 0.01 | 0.1 | 0.01 |
| Stability Data | 6 months stability in ACC | 9 months stability in ACC | 2 months stability in ACC | 19 months stability in room temperature and 11 months stability in ACC | 3 months stability in ACC | 11 months stability in ACC |
| Conclusions: | When comparing the differences in stability between Example 1 and Example 2 directed to CYC-CBDi formulations, the stability decreased when a Oil Brand C Sesame oil was added. | | When comparing the differences in stability between Example 3 and Example 4 directed to CYC-CBDi formulations, the stability significantly increased using Oil Brand A branded Olive Oil when compared to use of Oil Brand D Olive Oil. | | When comparing the differences in stability between Example 5 and Example 6 directed to CYC-CBDi formulations, the stability significantly increased by using Oil Brand A Olive Oil when compared to use of Oil Brand B Olive Oil. | |

Metal concentrations of chromium, copper and molybdenum were able to be determined in Oil Brand A oils and Oil Brand B-branded oils after the applicant contacted the manufacturers. Metal concentrations were not able to be determined from manufacturers of Oil Brand C branded and Oil Brand D oils, because it is believed that such information is proprietary confidential information not available to purchasers even though attempts were made to contact authorized representatives of the mentioned manufacturers.

Both Example 1 and Example 2 contained Oil Brand A oils. Notably, the addition of Oil Brand C led to decreased stability in Example 1, indicating the critical concentrations of one or more of copper, chromium, lithium, and molybdenum, with each metal being less than 1 ppm in the oil, as contributing to enhanced stability.

Example 3 contained Oil Brand D oil while Example 4 contained an Oil Brand A oil. There were significant differences in stability, two months in ACC for Example 3, while Example 4 had 11 months of stability in ACC and 19 months in room temperature. Without being bound by theory, the data indicated that critical concentrations of one or more of copper, chromium, lithium, and molybdenum, with each metal being less than 1 ppm in the oil, as contributing to enhanced stability.

Example 5 contained Oil Brand B oil while Example 6 contained Oil Brand A oil. There were significant differences in stability, three months in ACC for Example 3, while Example 6 had 11 months of stability in ACC. Without being bound by theory, the data indicated that critical concentrations of one or more of copper, chromium, lithium, and molybdenum, with each metal being less than 1 ppm in the oil, as contributing to enhanced stability.

Exemplary preparation of Example 4 shown in the foregoing table is described as follows. For Example 4 relating to CYC-CBDi (0.05-1%) Oil Brand A OLIVE+BCD, the following steps were performed.

To a beaker, 0.05% (0.02 g) of Cyclosporin, 1% (0.4 g) CBDi, and 0.2% (0.08 g) of ethanol were added, and the beaker was sonicated at 25° C. using the Branson 5510 sonicator for approximately 10-15 mins. At this point it was ensured that the powders had dissolved completely.

Next with a clean dropper, 2% (0.8 g) of sesame oil and 20.74% (8.296 g) of Oil Brand A olive oil were added, and sonication was carried out for 10 minutes.

Next, 6% (2.4 g) of Oil Brand A Polysorbate 80 was added with clean dropper, and sonication was carried out until a clear and single layer was obtained.

In another beaker, 70% (28 g) of PBS was taken and 0.01% (0.004 g) of beta-cyclodextrin was dissolved in it and added to the beaker containing the oil phase and mixed with an overhead electric stirrer for 20 minutes.

After stirring, the pH of the emulsion was measured using the Mettler Toledo pH meter. The pH was found to be in range and hence no pH adjustment was required.

The emulsion was then passed through the Avestin Emulsiflex-C3 Homogenizer for 3 cycles at 12,000-13,000 psi to homogenize the emulsion.

V. Comparison Studies Between Oil Brand a Oils and Other Oils in CYC-CBDi-THC Nanoformulations The following shows differences in stability of CYC-THC-CBDi formulations in Oil Brand A oil when compared with use of other oils.

The following describes an experimental preparation procedure for Example 2, directed to CYC-THC-CBDi (0.05-0.1-0.5), as further described in a later table. 0.1% (0.05 g) of THC was weighed in a beaker.

To the beaker, 0.05% (0.025 g) of Cyclosporin, 0.5% (0.25 g) CBDi, and 0.2% (0.1 g) of ethanol were added, and the beaker was sonicated at 25° C. using the Branson 5510 sonicator for approximately 10-15 mins. At this point it was ensured that the powders had dissolved completely.

Next with a clean dropper, 7.14% (3.57 g) of Oil Brand A oil was added, and sonication was carried out for 10 minutes.

Next, 2% (1 g) of Oil Brand A Polysorbate 80 was added with clean dropper, and sonication was carried out for 10 minutes.

In another beaker, 84.99% (42.495 g) of PBS was taken and 0.01% (0.005 g) of citric acid and 0.01% (0.05 g) of HP-BCD were dissolved in it and this was then mixed with the oil phase in the beaker using a magnetic stirrer for 15 minutes.

After stirring, the pH of the emulsion was measured using the Mettler Toledo PH meter. The pH was found to be below the required range and hence pH adjustment was required depending on the application. For example, dermal applications require a certain pH and ophthalmic applications require another pH.

0.4202% (0.2102 g) of basic water (from total water content) was used to raise the pH.

The remaining 4.57% (2.2899 g) of PBS was added to the flask and mixed for 15 minutes using a magnetic stirrer.

The emulsion was then passed through the Avestin Emulsiflex-C3 Homogenizer for 3 cycles at 12,000-13,000 psi to homogenize the emulsion.

theory, the data indicated that critical concentrations of one or more of copper, chromium, lithium, and molybdenum, with each metal being less than 1 ppm in the oil, as contributing to enhanced stability.

Both Example 3 and Example 4 contained Oil Brand A oils. Notably, the addition of Oil Brand C oil led to decreased stability in Example 3. Without being bound by theory, the data indicate that the critical concentrations of copper, chromium and molybdenum in the oil are factors for imparting pharmaceutical stability.

VI. Comparison Studies Between Different Nanoformulations Using Brand a Oils

The following relates to two stable nanoformulations of CYC-THC and CYC-THC-CBDi using Oil Brand A oils.

Formulation Content and Stability Studies
Percentage Content of Ingredients in the following batches (weight/weight)

| INGREDIENTS | Example 1-CYC-THC-CBDi (0.05-0.1-0.1) | Example 2-CYC-THC-CBDi (0.05-0.1-0.5) | Example 3-CYC-THC-CBDi (0.05-0.1-0.1) | Example 4-CYC + THC + CBDi |
|---|---|---|---|---|
| THC | 0.1 | 0.1 | 0.1 | 0.1 |
| CYC | 0.05 | 0.05 | 0.05 | 0.05 |
| CBDi | 0.1 | 0.5 | 0.1 | 0.5 |
| ETHANOL | 0.2 | 0.2 | 0.2 | 0.2 |
| Oil Brand C SESAME OIL | 4.25 | *NA | 4.25 | *NA |
| Oil Brand C SOYBEAN OIL | 1.75 | *NA | 1.75 | *NA |
| Brand A oil | 18 | 7.14 | 18 | 7.14 |
| ALPHA-TOCO | 0.375 | *NA | 0.375 | *NA |
| POLY80 | 4.5 | 2 | 4.5 | 2 |
| D.I WATER | 70.575 | *NA | *NA | *NA |
| PBS | *NA | *NA | 70.575 | *NA |
| MPBS | *NA | 90 | *NA | 90 |
| HPBCD | *NA | 0.01 | *NA | 0.01 |
| ASCORBIC ACID | 0.01 | *NA | 0.01 | *NA |
| Oil Brand D CITRIC ACID | *NA | 0.01 | *NA | 0.01 |
| STABILTY DATA | 2 months stability at Room Temperature and at ACC: failed at Analysis. | 4 months stability at ACC | Only 2 months stability at Room Temperature, ACC failed at analysis | 4 months ACC stability and ongoing |
| CONCLUSION | When comparing the differences in stability between Example 1 and Example 2 directed to CYC-THC-CBDi nanoformulations, the stability decreased when an Oil Brand C Sesame oil was added. | | When comparing the differences in stability between Example 3 and Example 4 directed to CYC-THC-CBDi nanoformulations, the stability decreased when an Oil Brand C Sesame oil was added. | |

Abbreviations
MPBS-PBS:WATER (50:50) MPBS is a modified version of PBS having 50 percent water content and 50 percent PBS content.
*NA-Not Applicable Example 1 and Example 2 contained Oil Brand A oils. Notably, the addition of Oil Brand C oils led to decreased stability in Example 1. Without being bound by theory, the data indicated that critical concentrations of one or more of copper, chromium, lithium, and molybdenum, with each metal being less than 1 ppm in the oil, as contributing to enhanced stability.

Both Example 3 and Example 4 contained Oil Brand A oils. Notably, the addition of Oil Brand C oils led to decreased stability in Example 3. Without being bound by theory, the data indicate that the critical concentrations of copper, chromium and molybdenum in the oil are factors for imparting pharmaceutical stability.

Both Example 1 and Example 2 contained Oil Brand A oils. Notably, the addition of Oil Brand C oil led to decreased stability in Example 1. Without being bound by Formulation Content and Stability Studies
Percentage Content of Ingredients in the following batches (weight/weight)

| INGREDIENTS | Example 1-CYC-THC (0.05-0.1) | Example 2-CYC + THC + CBDi (0.05% CYC-0.1% THC-0.5% CBDi) |
|---|---|---|
| CYC | 0.05 | 0.05 |
| THC | 0.1 | 0.1 |
| CBDi | *NA | 0.5 |
| ETHANOL | 0.2 | 0.2 |
| Oil Brand A SESAME OIL | 2 | *NA |
| Oil Brand A-other oil | 44.4 | *NA |
| Poly 80 | 9 | 7.14 |
| Poly 20 | — | *NA |
| Water | 44.225 | 2 |

-continued

Formulation Content and Stability Studies
Percentage Content of Ingredients in the following batches (weight/weight)

| INGREDIENTS | Example 1-CYC-THC (0.05-0.1) | Example 2-CYC + THC + CBDi (0.05% CYC-0.1% THC-0.5% CBDi |
|---|---|---|
| BKC | 0.025 | *NA |
| PBS | *NA | *NA |
| Citric Acid | *NA | 90 |
| HP-BCD | *NA | 0.01 |
| STABILITY DATA | 19 months stability at Room Temperature. | 4 months stability at ACC |

Abbreviations
HP-BCD is a short-hand abbreviation for hydroxypropyl β-cyclodextrin.

The following describes an experimental preparation procedure for Example 1 directed to CYC-THC (0.05-0.1).

0.1% (0.05 g) of THC was weighed in a beaker.

To the beaker, 0.05% (0.025 g) of Cyclosporin, and 2% (1 g) of Brand A sesame oil were added, and the beaker was sonicated at 25*C using the Branson 5510 sonicator for approximately 10-15 mins. At this point, it was ensured that the powders had dissolved completely.

Next with a clean dropper, 0.2% (0.1 g) of ethanol and, 44.4% (22.2 g) of Brand A oil were added, and sonication was carried out for 10 minutes.

Next, 9% (4.5 g) of Oil Brand A Polysorbate 80 was added with clean dropper, and sonication was carried out for 10 minutes.

In another beaker, 44.225% (22.1125 g) of HPLC water was taken and 0.025% (0.0125 g) of BKC was dissolved in it and this was then mixed with the oil phase in the beaker using a magnetic stirrer for 15 minutes.

After stirring, the pH of the emulsion was measured using the Mettler Toledo pH meter. The pH was found to be in the required range for the type of application requested and hence no pH adjustment was required.

As well known in the art, pH adjustment is needed depending on the application. For example, dermal applications require a certain pH and ophthalmic applications require another pH.

The emulsion was then passed through the Avestin Emulsiflex-C3 Homogenizer for 3 cycles at 12,000-13,000 psi to homogenize the emulsion.

Exemplary Machines

One exemplary machine used in the formulation preparation process is Rotary Evaporator from Buchi, type RE 111 with water bath type 461.

An exemplary homogenizer used in the formulation preparation process is Emusliflex-C3.

Miscellaneous. The term "w/w" refers to "weight by weight."

While certain of the preferred embodiments of the disclosed formulations have been described and specifically exemplified above, it is not intended that they be limited to such formulations. Various modifications may be made thereto without departing from the scope and spirit of the present invention.

What is claimed is:

1. A nanoemulsion formulation, comprising:
   (a) a pharmaceutically acceptable oil selected from olive oil, sesame and medium chain triglycerides, said oil having less than one part per million of each of copper, chromium, lithium and molybdenum; and
   (b) a cannabinoid or a salt or derivative thereof dissolved in the pharmaceutically acceptable oil; the cannabinoid or salt or derivative thereof having a weight percentage of up to 45% of the nanoemulsion formulation,
   wherein said cannabinoid or salt or derivative thereof in the nanoemulsion formulation is stable for at least 4 months when measured under accelerated chamber conditions.

2. The nanoemulsion formulation of claim 1, further comprising a pharmaceutically active agent.

3. The nanoemulsion formulation of claim 2, wherein the pharmaceutically active agent is cyclosporine, salts thereof or derivatives thereof and the nanoemulsion further comprises a solvent, a surfactant and an aqueous phase, wherein cyclosporine or salt or derivative thereof is (i) dissolved in globules of the pharmaceutically acceptable oil and (ii) as solid nanoparticles suspended in the aqueous phase.

4. The nanoemulsion formulation of claim 3, wherein the cyclosporine or salt or derivative thereof is about 0.05% w/w to about 5% w/w of the nanoemulsion formulation.

5. The nanoemulsion formulation of claim 4, wherein the cannabidiol is up to 2% w/w of the formulation, the tetrahydrocannabinol is up to 3% w/w of the formulation, and the cyclosporine or a salt or a derivative is up to about 0.1% w/w of the nanoemulsion formulation.

6. The nanoemulsion formulation of claim 3, wherein, the tetrahydrocannabinol is up to 2% w/w of the formulation and the cyclosporine or salt or derivative is up to 0.1% w/w of the nanoemulsion formulation.

7. The nanoemulsion formulation of claim 3, wherein the solvent is about 0.2% w/w to about 20% w/w of the nanoemulsion formulation.

8. The nanoemulsion formulation of claim 3, wherein the surfactant is about 0.5% w/w to about 25% w/w of the nanoemulsion formulation.

9. The nanoemulsion formulation of claim 3, wherein there are at least two cannabinoids and
   the cyclosporine is present in amount of about 0.05% w/w to about 5% w/w.

10. The nanoemulsion formulation of claim 1, wherein said formulation has less than 10% degradation after 3 months at room temperature.

11. The nanoemulsion formulation of claim 1, wherein the pharmaceutically acceptable oil is olive oil.

12. The nanoemulsion formulation of claim 1, wherein the pharmaceutically acceptable oil is olive oil and the amount of cannabinoid is from about 0.01% and about 10% w/w.

13. The nanoemulsion of claim 12, wherein the cannabinoid is cannabidiol isolate CBDi.

* * * * *